United States Patent
Venkataramani et al.

(10) Patent No.: US 11,216,420 B2
(45) Date of Patent: Jan. 4, 2022

(54) SYSTEM AND METHOD FOR HIGH REPLICATION FACTOR (RF) DATA REPLICATION

(71) Applicant: Nutanix, Inc., San Jose, CA (US)

(72) Inventors: Hema Venkataramani, San Jose, CA (US); Peter Scott Wyckoff, Durham, NC (US)

(73) Assignee: Nutanix, Inc., San Jose, CA (US)

( * ) Notice: Subject to any disclaimer, the term of this patent is extended or adjusted under 35 U.S.C. 154(b) by 94 days.

(21) Appl. No.: 16/051,467

(22) Filed: Jul. 31, 2018

(65) Prior Publication Data

US 2020/0042619 A1    Feb. 6, 2020

(51) Int. Cl.
*G06F 16/182*    (2019.01)
*H04L 12/24*    (2006.01)
(Continued)

(52) U.S. Cl.
CPC .......... *G06F 16/1844* (2019.01); *G06F 16/27* (2019.01); *H04L 41/0893* (2013.01); *H04L 67/1097* (2013.01)

(58) Field of Classification Search
CPC . G06F 16/1844; G06F 16/27; H04L 41/0893; H04L 67/1097; H04L 69/40; H04L 67/1095
See application file for complete search history.

(56) References Cited

U.S. PATENT DOCUMENTS 5,715,386 A * 2/1998 Fulton, III .......... G06F 11/1438
714/15

7,890,714 B1 * 2/2011 Tsaur .................. G06F 11/1458
711/162
(Continued)

FOREIGN PATENT DOCUMENTS

CN           105933448 A    9/2016
WO    WO 2018197928 A1    11/2018

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Cam Y T Truong
(74) *Attorney, Agent, or Firm* — Vista IP Law Group, LLP

(57) ABSTRACT

Systems and methods for iterative, high-performance, low-latency data replication. A method embodiment commences upon identifying one or more replica target nodes to receive replicas of working data. Steps of the method then compose at least one replication message. The replication message includes the location or contents of working data as well as a listing of downstream replica target nodes. The replication capacity is measured at the subject node. Based on the measured replication capacity, the subject node sends instructions in the replication message to one or more downstream replica target nodes. Any one or more of the downstream replica target nodes receives the instructions and iterates the steps of measuring its own capacity and determining the instructions, if any, to send to further downstream replica target nodes. Each replica target node replicates the working data. In some cases, the measured replication capacity is enough to perform all replications in parallel.

24 Claims, 14 Drawing Sheets

(51) Int. Cl.
H04L 29/08 (2006.01)
G06F 16/27 (2019.01)

(56) References Cited

U.S. PATENT DOCUMENTS

| | | | |
|---|---|---|---|
| 8,438,347 B1* | 5/2013 | Tawri | G06F 11/1456 711/114 |
| 8,549,518 B1 | 10/2013 | Aron et al. | |
| 8,554,918 B1* | 10/2013 | Douglis | G06F 11/3433 709/226 |
| 8,601,473 B1 | 12/2013 | Aron et al. | |
| 8,850,130 B1 | 9/2014 | Aron et al. | |
| 8,966,027 B1* | 2/2015 | Brandwine | G06F 9/45533 709/221 |
| 9,509,782 B2 | 11/2016 | Lawson et al. | |
| 9,772,866 B1 | 9/2017 | Aron et al. | |
| 10,152,268 B1* | 12/2018 | Chakraborty | G06F 3/0683 |
| 2003/0050966 A1* | 3/2003 | Dutta | H04L 67/1038 709/203 |
| 2003/0099237 A1 | 5/2003 | Mitra et al. | |
| 2006/0087986 A1 | 4/2006 | Dube et al. | |
| 2006/0114903 A1* | 6/2006 | Duffy, IV | H04L 12/1854 370/390 |
| 2006/0206586 A1 | 9/2006 | Ling et al. | |
| 2012/0023179 A1* | 1/2012 | Bernbo | H04L 69/40 709/206 |
| 2012/0226712 A1* | 9/2012 | Vermeulen | H04L 29/06047 707/770 |
| 2015/0234907 A1* | 8/2015 | Shinohara | G06F 11/3664 702/123 |
| 2016/0127234 A1 | 5/2016 | Vanska | |
| 2016/0142248 A1* | 5/2016 | Thubert | G06F 16/2237 370/392 |
| 2016/0323379 A1* | 11/2016 | Kidambi | H04L 67/1095 |
| 2016/0364440 A1* | 12/2016 | Lee | G06F 16/2379 |
| 2017/0048169 A1* | 2/2017 | Hunt | H04L 51/30 |
| 2017/0154092 A1* | 6/2017 | Reimer | G06F 16/13 |
| 2017/0187785 A1 | 6/2017 | Johnson et al. | |
| 2017/0346760 A1* | 11/2017 | Kelly | H04L 67/1097 |
| 2018/0011874 A1* | 1/2018 | Lacapra | H04L 67/1097 |
| 2018/0109467 A1* | 4/2018 | Miller | H04L 67/1008 |
| 2018/0357055 A1 | 12/2018 | Apte et al. | |
| 2018/0365008 A1 | 12/2018 | Chandramouli et al. | |
| 2019/0026085 A1 | 1/2019 | Bijani et al. | |
| 2019/0354438 A1* | 11/2019 | Mohanta | G06F 11/1092 |
| 2020/0084284 A1 | 3/2020 | Chauhan | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", 14th USENIX Symposium on Networked Systems Design and Implementation, NSDI '17, (Mar. 27, 2017).
Poitras, Steven. "The Nutanix Bible" (Jul. 9, 2019), from https://nutanixbible.com/(Publication date based on indicated capture date by Archive.org; first publication date unknown).
Henry, A., "How to Migrate Mainframe Batch to Cloud Microservices", Blu Age Blog, (Mar. 9, 2018).
Kublr Team, "How to Modernize Legacy Applications for a Microservices-Based Deployment", KublrBlog, (Jan. 29, 2018).
Delimon, J. et al., "DNS for External Web Services", Microsoft TechNet, (Mar. 27, 2012).
Kelley, S., "dnsmasq", Wikipedia, (Last edited on Dec. 24, 2018).
Commvault, "Commvault Software: Enterprise Cloud Backup and Archive, Simplified", (Jul. 2017).
Plotka, B., "Introducing kEdge: a fresh approach to cross-cluster communication.", Improbable news and blog, (Mar. 19, 2019).
Kubernetes, "Cross-cluster Service Discovery using Federated Services", Kubernetes, (Mar. 12, 2019).
Cilium, "Deep Dive into Cilium Multi-cluster", Cilium blog, (Mar. 18, 2019).
Kloudless, "Kloudless Announces Support for Docker: Deploy Self-Hosted Kloudless Enterprise as a Container", PRNewswire, (Sep. 14, 2016).
Thorman, D., "Level Up: A Guide to Kloudless Enterprise Clustering (III of III)", Kloudless blog, (Sep. 28, 2015).
Lombardi, P., "Set up a production-quality Kubernetes cluster on AWS in 15 minutes", Microservices Architecture Guide, (Mar. 2, 2017).
Non-Final Office Action dated Oct. 2, 2020, 2020 for U.S. Appl. No. 16/528,139.
Final Office Action dated Feb. 26, 2021, 2020 for U.S. Appl. No. 16/528,139.
Non-Final Office Action dated Aug. 25, 2021, 2020 for U.S. Appl. No. 16/528,139.

* cited by examiner

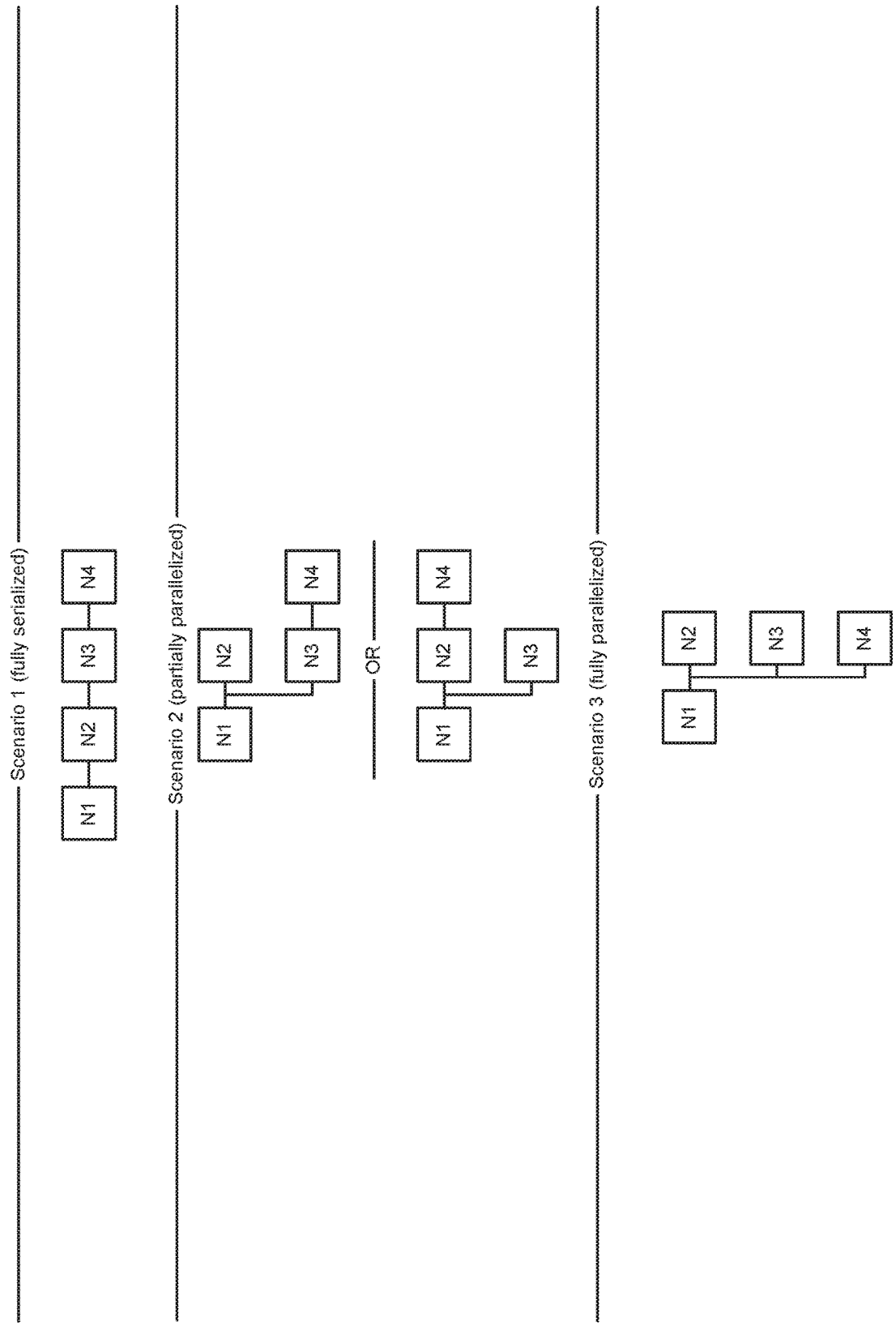

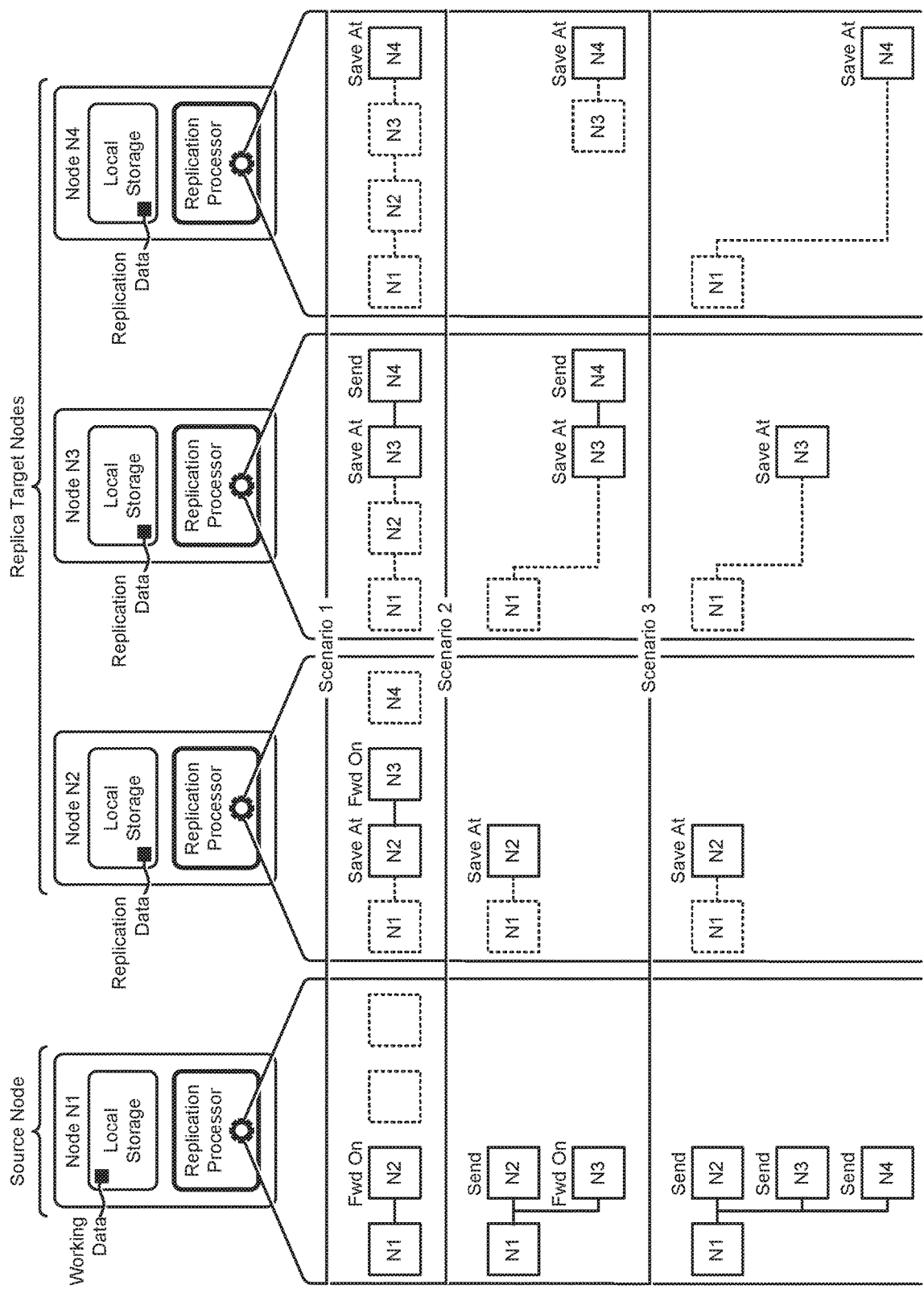
FIG. 1B2

SYSTEM AND METHOD FOR HIGH REPLICATION FACTOR (RF) DATA REPLICATION

FIELD

This disclosure relates to computing systems, and more particularly to techniques for a system and method for high replication factor (RF) data replication.

BACKGROUND

Modern distributed computing systems have evolved to natively coordinate distributed compute, storage, networking, and/or other distributed resources in such a way that incremental scaling can be accomplished in many dimensions. For example, some clusters in a distributed computing system might deploy hundreds of nodes or more that support several thousand or more autonomous virtualized entities (VEs) that are individually tasked to perform one or more of a broad range of computing workloads. In many cases, several thousand VEs (e.g., VMs, executable containers, etc.) might be launched (e.g., in a swarm) to perform some set of tasks, then finish and collate their results, then self-terminate. As such, the working data, configuration (e.g., topology, resource distribution, etc.), and/or other characteristics of the distributed computing system can be highly dynamic as the workload fluctuates.

The high storage I/O (input/output or IO) demand of the modern distributed computing system has precipitated an increase in the prevalence of distributed storage resources in the systems. Specifically, such distributed storage resources can comprise aggregated physical storage facilities (e.g., disk drives) that are combined to form a logical storage pool throughout which storage pool the data may be efficiently distributed according to various metrics and/or objectives. Metadata describing the storage pool and/or its virtualized representations may be also distributed any number of times among various nodes in the distributed computing system.

Users of these distributed systems have a data consistency expectation (e.g., "strictly consistent") of a distributed computing platform to provide consistent and predictable storage behavior (e.g., availability, accuracy, etc.) for data and/or metadata. Distributed computing platform providers can address such expectations by implementing "high availability systems". One concept pertaining to high availability systems involves replication (e.g., copying) of data across multiple nodes, such that if one node fails, there are replicated copies of the data. A replication policy can be codified and observed so as to be able to retrieve a copy of needed data in case of a node and/or storage facility failure that results in a loss of access to the needed data.

For example, a given replication policy might characterized by a numeric replication factor (RF) such as "RF=3", indicating that three replicas of certain data (e.g., metadata, user data, etc.) may be distributed among various available nodes in the cluster. In this case, a replication procedure is implemented in the cluster to perform the replication operations (e.g., data copy operations) that ensure replicas are present and appropriately refreshed (e.g., according to some recovery point objective). Such cluster-wide replication procedures often follow a static sequence and/or flow of operations as determined by the distributed computing platform provider. As an example, a platform provider might implement a static serialized replication procedure that always copies a first replica of data from a source node to a first target node, which first target node then copies a second replica of the data to a second target node, and so on.

Unfortunately, static replication procedures such as the aforementioned serialized replication procedure fail to consider the deleterious impact that resource availability might have on carrying out the static replication procedure. More specifically, static replication procedures fail to consider the impact that then-current node-by-node resource availability might have on the overall efficacy of the static replication procedure. As such, the occurrence of limited resource capacities, even if the limited resource capacity is only temporary, can cause long delays between the time that data is initially available to be replicated and the time that the replicas have been safely stored at the other nodes. In addition to the aforementioned resource availability, many other situations can arise where the performance of a static replication procedure is far inferior (e.g., suboptimal) to the performance that could be achieved by alternative replication procedures. What is needed is technological solution for carrying out replication operations over multiple nodes of a computing cluster.

SUMMARY

The present disclosure describes techniques used in systems, methods, and in computer program products for high replication factor (RF) data replication, which techniques advance the relevant technologies to address technological issues with legacy approaches. More specifically, the present disclosure describes techniques used in systems, methods, and in computer program products for iterative execution of data replication operations under conditions of dynamically-changing resource availabilities. Certain embodiments are directed to technological solutions for performing node-by-node analysis to adjust replication operations based at least in part on the then-current resource conditions as observed at each node.

The disclosed embodiments modify and improve over legacy approaches. In particular, the herein-disclosed techniques provide technical solutions that address the technical problems attendant to suboptimal data replication procedures. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, when implementing technical solutions that address the technical problems that arise from suboptimal data replication procedures, the overall latency exhibited in the replication system is greatly reduced as compared with practices that fail to perform node-by-node analysis to adjust replication operations based on then-current resource conditions.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of distributed storage systems as well as advances in various technical fields related to high performance computing.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 1B1 illustrates a set of possible scenarios for node-by-node data replication.

FIG. 1B2 illustrates alternative mechanisms for performing node-by-node data replication operations under conditions of dynamically-changing resource availabilities, according to some embodiments.

FIG. 2 depicts a data replication technique as implemented in systems that perform data replication under conditions of dynamically-changing resource availabilities.

DETAILED DESCRIPTION

Figure 1A:
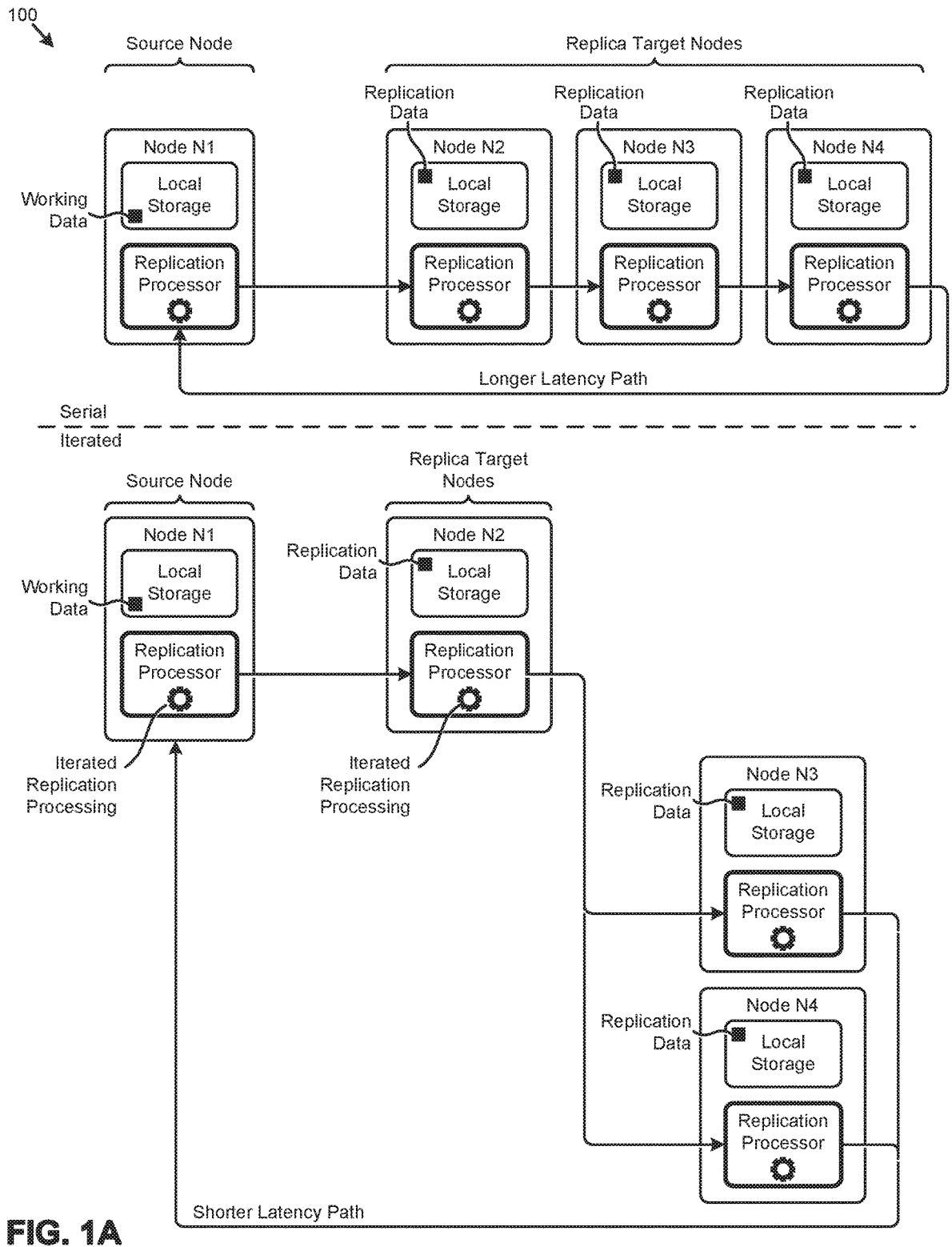
FIG. 1A illustrates a computing environment in which embodiments of the present disclosure can be implemented.

Embodiments in accordance with the present disclosure address the problem of suboptimal data replication procedures. Some embodiments are directed to approaches for performing node-by-node analysis to adjust replication operations based at least in part on the then-current resource conditions as observed at each node. The accompanying figures and discussions herein present example environments, systems, methods, and computer program products that implement iterative execution of data replication operations under conditions of dynamically-changing resource availabilities.

Overview

Disclosed herein are techniques for performing node-by-node analyses to adjust replication operations based at least in part on the then-current resource conditions as observed at each node. In certain embodiments, a node topology is established for a cluster that identifies sets of replica target nodes that are assigned to receive replicas of working data from one or more source nodes in the cluster. A mechanism is implemented in each node to quantify the available capacity of network resources to perform replication operations at the node (the "replication capacity"). When a replication event is detected to replicate a set of working data associated with a source node, the replica target nodes assigned to receive the replication data are determined from the node topology. A replication message is composed to perform a replication of the working data at the replica target nodes. The payload size (e.g., working data size) of the replication message and the then-current replication capacity at the source node are analyzed to determine the number of replica target nodes to which the source node has the capacity to issue the replication message. If the number of replica target nodes is less than the quantity RF minus 1, then forwarding instructions are codified into an instance of the replication message to form a downstream replication message.

The downstream replication message is then issued to a selected replica target node, and replication messages (e.g., with no forwarding instructions) are issued to any remaining replica target nodes from the determined number of replica target nodes. The foregoing procedure serves to dynamically determine data replication operations to carry out a particular node based at least in part on the then-current resource capacities. The selected replica target node that receives the forwarding instructions repeats the foregoing procedure, and the procedure iterates until the working data is replicated in accordance with the specified replication factor. In many cases, two or more replication messages and/or downstream replication messages can be issued in parallel to respective replica target nodes. Any of the respective replica target nodes that receive forwarding instructions in a downstream replication message would issue replication messages and/or downstream replication messages to other replica target nodes.

In certain embodiments, a rank order of the replica target nodes is specified in the node topology. In certain embodiments, forwarding instructions are issued in a downstream replication message to a selected replica target node having the highest position in an order. In certain embodiments, the replica target nodes are ordered by the source node. In certain embodiments, the replica target nodes are ordered during processing of a second or Nth iteration of the foregoing procedure.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A illustrates a computing environment in which embodiments of the present disclosure can be implemented. The figure in being presented to contrast a serial replication procedure with an iterated replication procedure.

As shown, the serial replication procedure incurs a relatively longer latency path as compared with non-serial replication procedures. In the serial replication procedure, all copies of the working data are sent in succession to a next downstream replication node. When each replica target node saves its copy, each replica target node sends an acknowledgement message to the source node to indicate that its copy has been saved. The source node collects such messages, and when the last replica target node has saved its copy, the source node can continue processing. In this serialized scenario, the latency between the time of generation of working data at the source node to the time when all replicas have been saved is proportional to M times the replication factor.

In computing environments where the replication factor is 3 or greater, there can be many opportunities for parallelization. Specifically, in computing environments where downstream replication nodes are each are each capable of performing computing tasks as well as performing storage tasks, the source node could consider options for accomplishing parallel replication. For example, and as shown, the source node can send instructions in parallel to more than one of replica target nodes The determination as to which of many alternatives to take at any particular node and at any particular time is performed iteratively at each node in a replication group (e.g., at each of the replica target nodes). As such, so long as there are resources available at a particular node at a particular moment in time, storing of all of the replication copies can be carried out in parallel. For a fully parallelized scenario where the replication factor (RF) is three, sufficient resources would correspond to having enough bandwidth available for sending three replicas of the working data to all three different replica nodes of the replica group. On the other hand, as shown, if there are somewhat fewer resources available at a particular node at a particular moment in time, then sending the replicas can be performed in parallel fashion to fewer than all remaining replica nodes of the replica group. If there are even still fewer resources available at a particular node and at a particular moment in time, then the sending of a replica and corresponding instructions can go out to just one replica node of the replica group. Operation of the foregoing node-by-node analysis can result in replication operating being performed in a serial fashion, or in a parallel fashion, or in a partial parallel and partial serial fashion. The possibilities for RF=3 are shown and described as pertains to FIG. 1B1.

FIG. 1B1 illustrates a set of possible scenarios for node-by-node data replication. Scenario 1 is fully serialized. A source node N1" forwards instructions to node N2, which replicates data at N2 and forwards instructions to N3, which replicates data at N3 and forwards a copy of the data to N4. The shown possibilities in scenario 2 (partially parallelized) can occur when a source node employs two nodes to perform replication operations in parallel, one of which nodes forward data to N4. The choice of which node does the last forwarding can be determined on the basis of a heuristic (e.g., always choose first, or always choose last), or on the basis of a system measurement (e.g., which node is less loaded), possibly in combination with further heuristics. Scenario 3 depicts a fully parallelized replication scenario for RF=3. As shown, the source node N1 employs three nodes in parallel, each of which three nodes performs a save of the replication data.

The scenarios depicted can be accomplished by having each node perform its own node-specific analysis of its node-specific, then-current conditions. More specifically, in exemplary embodiments, each node makes its own determination as to its then-current capabilities, and each node determines the extent to which it can parallelize operations that are to be performed by downstream nodes. As the replication factor increases, the number of alternative sequences possible between a fully serialized replication procedure and a fully parallelized replication procedure increases geometrically. A sample of possibilities for node-by-node analysis and resulting downstream instructions, given RF=3, are shown and described in FIG. 1B2.

Figure 2:
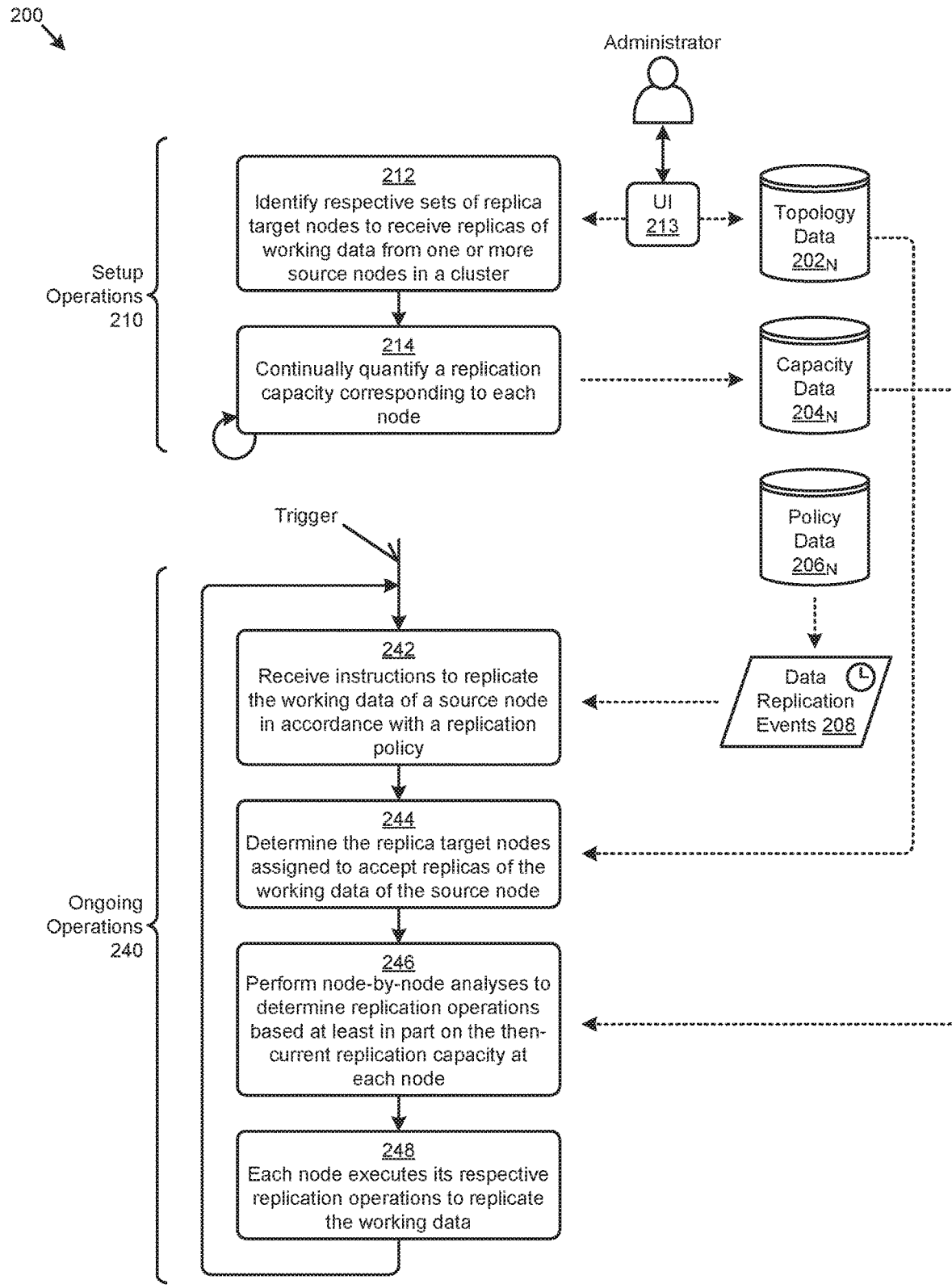

FIG. 1B2 illustrates alternative sequences of data replication operations under conditions of dynamically-changing resource availabilities that occur in computing environments in which embodiments of the present disclosure can be implemented. The shown environment 100 includes a source node and several replica target nodes. The source node generates some working data, which working data is to be replicated at three other nodes (e.g., RF=3). In each of the shown scenarios (e.g., scenario 1, scenario 2, and scenario 3), the source node sends a copy of the working data to at least one downstream replica target node, and that downstream replica target node makes its own determination as to its next replication actions and so on.

In some situations, such as is depicted in scenario 1, if the logic in the replication processor determines that there are only sufficient resources to send instructions to one downstream node, the logic will select the next downstream node and prepare instructions to send to that downstream node. The instructions are prepared such that the receiving node has sufficient information to determine any additional downstream nodes. This logic of the replication processor is carried out iteratively, once at each node, such that each node can make its own determination of its then-current resources and can make its own determination as to what next replication actions to take.

In scenario 2, the logic of the replication processor of node N1 determines that there are sufficient resources to send instructions to two downstream nodes. Accordingly, the logic will select two downstream nodes and prepare separate messages to send to each one of the selected downstream nodes. The message that is sent to a first one of the two selected nodes comprises the working data to be replicated along with instructions to the receiving node to save the working data. The message sent to the other selected node is prepared such that the receiving node receives the working data to be replicated in addition to sufficient information for the receiving node to determine any additional downstream nodes.

This logic of the replication processor is carried out iteratively, once at each node such that each node can make its own determination as to its own then-current resources and what actions to take. As such, when node N2 receives its instructions from node N1, it saves its node-local copy of the working data and checks itself for resources. In this scenario 2, there are sufficient resources to forward instructions to one downstream node. Node N2 does so by forwarding instructions to a next downstream node, specifically node N3. Node N3 then perform its iteration, resulting in its local copy of the working data being saved at node N3 and resulting in node N3 forwarding instructions to the next downstream node, in this case node N4.

In example scenario 3, node N1 determines that it does have sufficient resources to send the working data to each of (1) downstream node N2, (2) downstream node N3, and (3) downstream node N4. Node N1 accomplishes this by forming instructions for each of node N2, node N3, and node N4, and sending each a copy of the working data. As such, the replication is substantially parallelized.

Returning to the discussion of scenario 2, it can happen that when node N2 performs its iteration of the replication logic, it determines it has sufficient resources to send to two downstream nodes in parallel. In this case, node N2 would form instructions to each of node N3 and node N4, which would indicate to node N3 and node N4 to save a copy of the working data in its local storage.

Figure 1C:
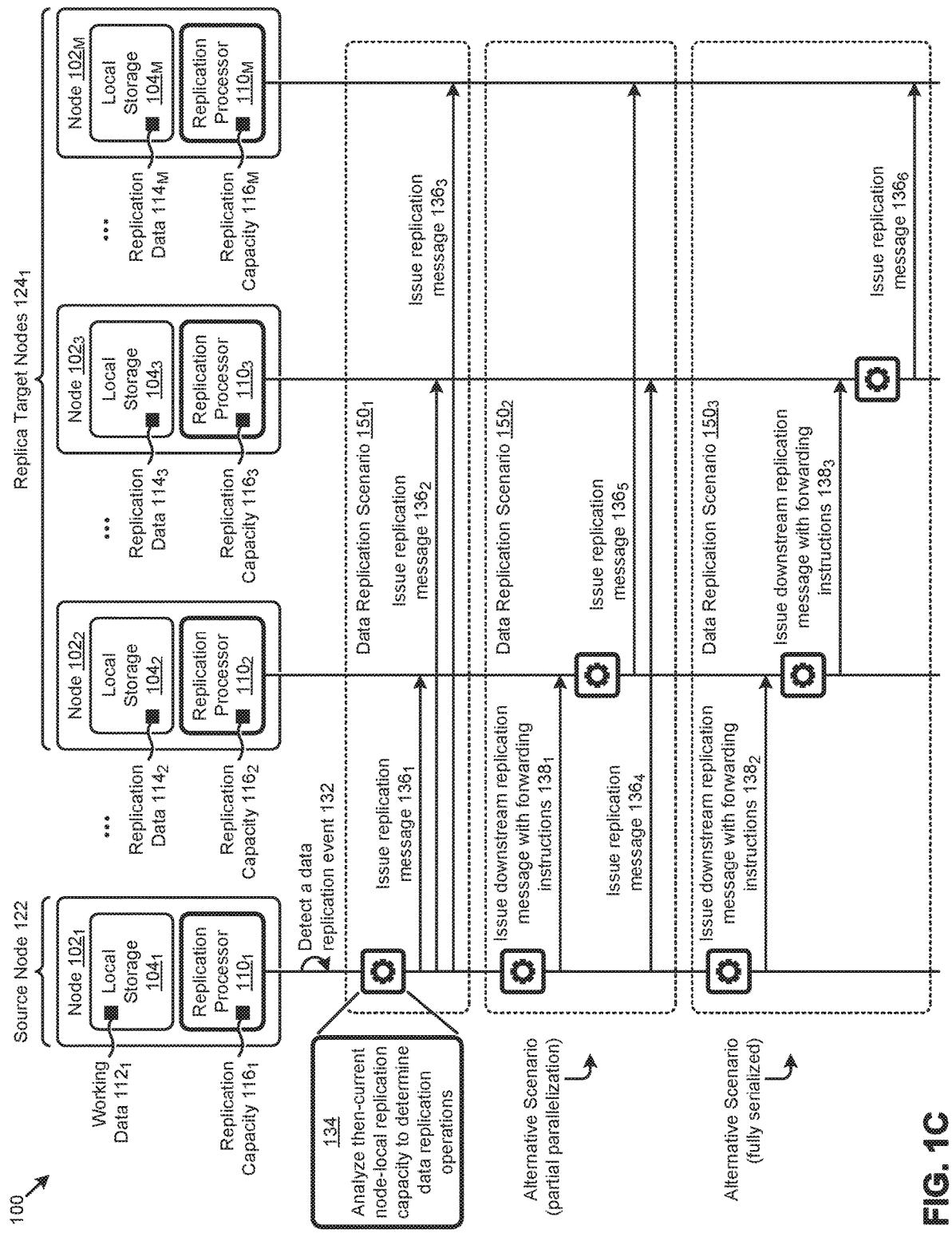
FIG. 1C illustrates techniques for carrying out alternative sequences of data replication operations under conditions of dynamically-changing resource availabilities, according to some embodiments.

FIG. 1C illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1C illustrates one aspect pertaining to performing node-by-node analysis to adjust replication operations based at least in part on the then-current resource conditions as observed at each node. Specifically, the figure presents a logical depiction of how the herein disclosed techniques can be implemented in a computing environment (e.g., a distributed computing environment) to perform iterative execution of data replication operations under conditions of dynamically-changing resource availabilities.

The logical depiction of FIG. 1C illustrates representative computing nodes (e.g., node $102_1$, node $102_2$, node $102_3$, ..., node $102_M$) that each have local storage facilities (e.g., local storage $104_1$, local storage $104_2$, local storage $104_3$, ..., local storage $104_M$). To comply with a particular replication policy implemented in computing environment 100, certain nodes in the environment are identified to receive replicas of the working data of a particular source node. As shown in FIG. 1C, for a replication policy characterized by a replication factor of three (e.g., RF=3), a set of replica target nodes $124_1$ (e.g., node $102_2$, node $102_3$, ..., node $102_M$) are identified to receive instances (e.g., copies) of a set of working data $112_1$ associated with a source node 122 (e.g., node $102_1$) that are locally stored as instances of replication data (e.g., replication data $114_2$, replication data $114_3$, ..., replication data $114_M$). Any of the instances of replication data can then be accessed to recover the working data $112_1$ of the source node 122 in the event of a failure at the source node.

A static replication procedure is often implemented to replicate the working data $112_1$ over the replica target nodes $124_1$. As an example, a static serialized replication procedure might be implemented that always copies a first replica of working data $112_1$ to node $102_2$, which then copies a second replica to node $102_3$, which then copies a third replica to node $102_M$. Unfortunately, such static serialized replication procedures fail to consider the capacity of the available resources at the source node 122 and replica target nodes $124_1$, which resources are needed to carry out the replication operations.

As another example, a static parallelized replication procedure might be implemented where the source node always sends replicas of working data $112_1$ to all downstream nodes in parallel. Unfortunately, such static parallelized replication procedures fail to consider the capacity of the available resources at the respective nodes. More specifically, it often happens that certain nodes of a cluster host workloads that are I/O intensive (e.g., database applications), such that those nodes would necessarily have more replication work to do. This situation is not considered in static parallelized replication procedures.

As indicated in the foregoing examples, there can be many situations that arise where the performance of a static replication procedure is far inferior, or at least suboptimal, with respect to the performance that could be achieved by replication procedures that iteratively consider then-current conditions on a node-by-node basis.

In the embodiment of FIG. 1C, the herein disclosed techniques address such problems attendant to suboptimal data replication procedures at least in part by implementing an instance of a replication processor (e.g., replication processor $110_1$, replication processor $110_2$, replication processor $110_3$, ..., replication $110_M$) at the source node 122, the replica target nodes $124_1$, and other nodes in computing environment 100.

According to the techniques disclosed herein, the replication processor of any node participating in a replication procedure analyzes the then-current node-local replication capacity to determine data replication operations to perform at the node. As used herein, a "replication capacity" of a particular node is the available capacity of network resources to perform replication operations at the node. In certain embodiments, the replication capacity might also consider the available capacity of CPU resources. By analyzing the then-current node-local replication capacity, the replication operations to be executed at any stage (e.g., iteration) and/or node of a replication procedure can be dynamically adjusted to account for changing resource conditions in computing environment 100.

As such, the herein disclosed techniques facilitate improvements in computer functionality that serve to more efficiently use the computing resources, memory resources, storage resources, networking resources, and/or other resources of distributed computing environments. Specifically, applications of the herein disclosed techniques can reduce the latencies and/or idle resources of serialized replication operations by executing some or all of the replication operations in parallel where permitted by the then-current replication capacity. In other cases, oversubscription of the then-current replication capacity of a particular node can be eliminated by serializing certain replication operations at the node.

To further illustrate such applications of the herein disclosed techniques in computing environment 100, a representative set of data replication scenarios are presented in FIG. 1C. Each of the data replication scenarios depict a set of high order interactions (e.g., operations, messages, etc.) at source node 122 and replica target nodes $124_1$ to complete a replication of working data $112_1$ over the nodes. As shown, any of the three representative data replication scenarios might occur in response to detecting a data replication event (e.g., a scheduled replication) at source node 122 (operation 132). In all scenarios, the then-current node-local replication capacity (e.g., replication capacity $116_1$) at source node 122 is analyzed to determine the replication operations to execute at source node 122 (operation 134). In the case of data replication scenario $150_1$, the then-current node-local replication capacity (e.g., replication capacity $116_1$) indicates that source node 122 is capable of issuing replication messages to all three replica target nodes $124_1$ in parallel (message $136_1$, message $136_2$, and message $136_3$). Each of the three "receiving nodes" will store an instance of the working data $112_1$ as a local instance of replicated data.

In the case of data replication scenario $150_2$, the then-current node-local replication capacity (e.g., replication capacity $116_1$) at source node 122 indicates that source node 122 is capable of issuing replication messages to two receiving nodes from the three replica target nodes $124_1$. In this case, a downstream replication message with forwarding instructions is issued to a selected receiving node (e.g., node $102_2$) (message $138_1$), and a replication message (e.g., with no forwarding instructions) is issued to the other receiving node (e.g., node $102_3$) (message $136_4$). The forwarding instructions issued to node $102_2$ will specify the remaining replica target node (e.g., node $102_M$) as the "downstream node" that is to receive a replica of the working data $112_1$.

The selected receiving node (e.g., node $102_2$) that receives the downstream replication message analyzes its then-current node-local replication capacity (e.g., replication capacity $116_2$) to determine the replication operations to execute at the node. As shown in data replication scenario $150_2$, analysis of the then-current node-local replication capacity (e.g., replication capacity $116_2$) results in node $102_2$ issuing a replication message to node $102_M$ (message $136_5$). In this case, since node $102_2$ is instructed to forward an instance of working data $112_1$ to merely one downstream node, certain replication operation characteristics (e.g., number of receiving nodes) might not need to be determined. However, the then-current node-local replication capacity might be used to determine other replication operation characteristics, such as a message issuance delay that can be executed to accommodate the sometimes ephemeral nature of observed high outstanding workload period.

In the case of data replication scenario $150_3$, the then-current node-local replication capacity (e.g., replication capacity $116_1$) at source node 122 might indicate that source node 122 is capable of issuing replication messages to merely one receiving node. In this case, a downstream replication message with forwarding instructions is issued to a selected receiving node (e.g., node $102_2$) (message $138_2$). The selected receiving node (e.g., node $102_2$) in this second stage (e.g., iteration) of the replication procedure then analyzes its then-current node-local replication capacity (e.g., replication capacity $116_2$) to determine that node $102_2$ is capable of issuing a replication message to one receiving node from the remaining two downstream nodes. As such, a downstream replication message with forwarding instructions is issued to a selected receiving node (e.g., node $102_3$) (message $138_3$). The selected receiving node (e.g., node $102_3$) in this third stage (e.g., iteration) of the replication procedure then analyzes its then-current node-local replication capacity (e.g., replication capacity $116_3$). As can be observed, the analysis results in node $102_3$ issuing a replication message to node $102_M$ (message $136_6$). The replication procedure at node $102_M$ then analyzes its then-current node-local replication capacity (e.g., replication capacity $116_M$), and determines what instructions, if any, to send to further downstream nodes.

One embodiment of the herein disclosed techniques for high RF data replication is disclosed in further detail as follows.

FIG. 2 depicts a data replication technique 200 as implemented in systems that perform data replication under conditions of dynamically-changing resource availabilities. As an option, one or more variations of data replication technique 200 or any aspect thereof may be implemented in the context of the architecture and functionality of the embodiments described herein. The data replication technique 200 or any aspect thereof may be implemented in any environment.

FIG. 2 illustrates one aspect pertaining to performing node-by-node analysis to adjust replication operations based at least in part on the then-current resource conditions as observed at each node. Specifically, the figure presents one embodiment of certain steps and/or operations that facilitate iterative execution of data replication operations under conditions of dynamically-changing resource availabilities. As can be observed, the steps and/or operations can be partitioned into a set of setup operations 210 and a set of ongoing operations 240.

The setup operations 210 of data replication technique 200 can commence by identifying respective sets of replica target nodes that are assigned to receive replicas of working data from one or more source nodes in a cluster (step 212). For example, a user or administrator might interact through a user interface (UI) such as the shown UI 213. Using the topology of the entire cluster as a baseline, the user or administrator can consider network topologies and/or other information associated with the network connectivity between any combinations of a source node and replica target nodes. Assignments of nodes to a topology (e.g., network location, order, precedence, etc.) that in turn corresponds to a particular RF group might be stored in topology data $202_N$ and made accessible to ongoing operations at any node of the cluster. The topology data can be centralized or distributed.

A replication capacity corresponding to each of the nodes is continually quantified (step 214). As an example, a mechanism might be implemented at each node to observe the replication capacity of the nodes at certain intervals and store the most recent observation or observations in a set of capacity data $204_N$. Strictly as one example, the foregoing mechanism might include maintaining a moving average of available network capacity. In certain cases, the moving average of available network capacity might cover multiple time periods, and/or might be calculated based on decay over the multiple time periods, and/or might be sufficiently detailed so as to track network capacity that is point-to-point specific (e.g., from a source node to a set of downstream nodes). In some cases, access, by a source node, to different downstream nodes, might employ different network interfaces, any of which might have different performance characteristics, and any of which performance characteristics may affect point-to-point capacities.

Given the foregoing setup, the ongoing operations 240 of data replication technique 200 can commence by receiving a trigger (e.g., a new policy or new policy characteristic) and instructions (e.g., codification of the policy) to replicate the working data of a source node in accordance with a particular new or updated replication policy (step 242). For example, the instructions might correspond to one or more types of data replication events 208 (e.g., changed data block of working data, a changed VM configuration, etc.) that are raised in response to a replication policy (e.g., a cluster-wide policy) that is codified in a set of policy data $206_N$. In this example, policy data $206_N$ describes a replication factor and a replication schedule (e.g., replication policy rules and/or replication schedules that raise the data replication events 208) associated with the source node. The replica target nodes assigned to accept replicas of the working data of the source node are determined (step 244). As can be observed, the replica target nodes might be determined from the topology data $202_N$ earlier described. Rather than perform replication of the working data using a static set and flow of replication operations, a node-by-node analysis of node-specific, then-current replication capacity is performed to determine the replications operations to implement at each of the nodes participating in the replication (step 246). As illustrated, the then-current replication capacity can be accessed via capacity data $204_N$. Once determined, the replication operations are executed at each node to replicate the working data of the source node (step 248). The operations of step 246 and step 248 are carried out by each node, and each node might employ a downstream node to carry out additional replication operations. This is shown by the loopback from step 248 back to step 242. As such, step 242 can be entered either by the trigger, or as a result of following the loopback.

One embodiment of a system for implementing the data replication technique 200 and/or other herein disclosed techniques is disclosed as follows.

Figure 3A:
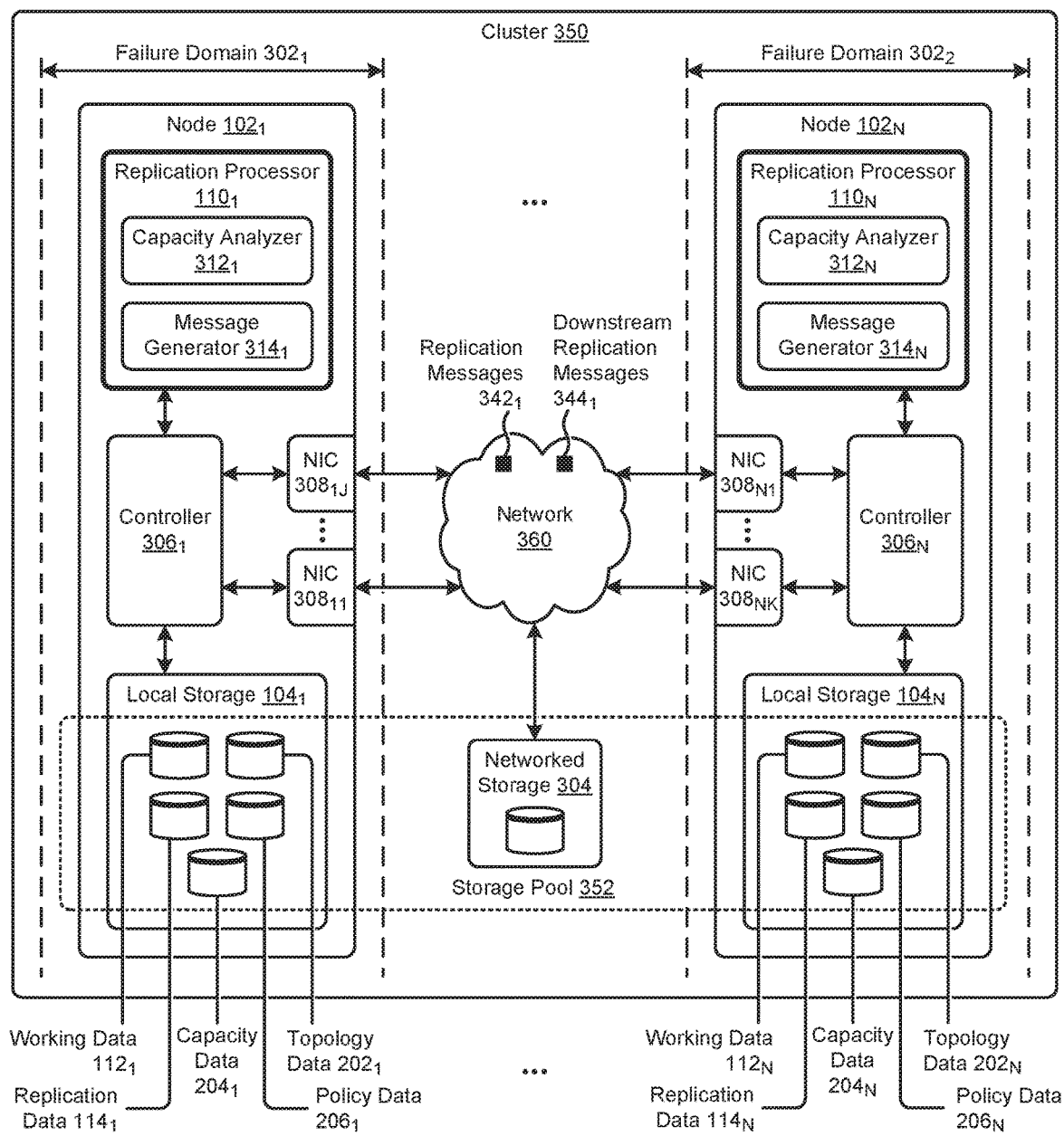
FIG. 3A presents a block diagram of a system that performs iterative execution of data replication operations under conditions of dynamically-changing resource availabilities.

FIG. 3A presents a block diagram of a system 3A00 that performs iterative execution of data replication operations under conditions of dynamically-changing resource availabilities. As an option, one or more variations of system 3A00 or any aspect thereof may be implemented in the context of the architecture and functionality of the embodiments described herein. The system 3A00 or any aspect thereof may be implemented in any environment.

FIG. 3A illustrates one aspect pertaining to performing node-by-node analysis to adjust replication operations based at least in part on the then-current resource conditions as observed at each node. Specifically, the figure is being presented to show one embodiment of certain representative components and associated data flows that describe how the herein disclosed techniques might be implemented in a distributed computing environment. The components and data flows shown in FIG. 3A present one partitioning and associated data manipulation approach. The specific example shown is purely illustrative and other subsystems, data structures, and/or partitioning are reasonable.

As shown in FIG. 3A, the system 3A00 comprises representative nodes (e.g., node $102_1$, . . . , node $102_N$) in a cluster 350 that have multiple tiers of storage in a storage pool 352. Each node can be associated with one server or appliance, multiple servers or appliances, or portions of a server and/or appliance. As can be observed, the nodes can be associated with respective failure domains (e.g., failure domain $302_1$, . . . , failure domain $302_2$). A failure domain bounds the portion of system 3A00 that can be affected by a failure that occurs within the domain. As a representative application of failure domains, a source node and corresponding replica target nodes for a particular data replication strategy are often selected so that each of the nodes are in different failure domains.

The multiple tiers of storage of storage pool 352 can include instances of local storage (e.g., local storage $104_1$, . . . , local storage $104_N$). For example, the local storage can be within or directly attached to a server and/or appliance associated with the nodes. Such local storage can include solid state drives (SSDs), hard disk drives (HDDs), and/or other storage devices. As can be observed, the local storage of the nodes can store instances of the working data for the nodes (e.g., working data $112_1$, . . . , working data $112_N$), the replication data of one or more source nodes (e.g., replication data $114_1$, . . . , replication data $114_N$), the node topology data (e.g., topology data $202_1$, . . . , topology data $202_N$), the replication capacity data of the nodes (e.g., capacity data $204_1$, . . . , capacity data $204_N$), and the policy data (e.g., policy data $206_1$, . . . , policy data $206_N$).

Any node in system 3A00 can implement a controller (e.g., controller $306_1$, . . . , controller $306_N$) to facilitate, at least in part, access to storage facilities (e.g., local storage, networked storage, etc.) by the applications and/or processes operating at the node. The controllers serve I/O (input/output or IO) operations to and from the local storage using various node-local protocols (e.g., iSCSI, SMB, etc.). Furthermore, the controllers service I/O operations associated with any storage that is accessible through a network 360, such as a networked storage 304 (e.g., a storage area network or SAN, network attached storage or NAS, etc.). Such networked storage communications and any inter-node communications over network 360 are facilitated by one or more network interface cards (e.g., NIC $308_{11}$, . . . , NIC $308_{1J}$, NIC $308_{N1}$, . . . NIC $308_{NK}$) configured at the nodes.

Other components are implemented in system 3A00 to facilitate the herein disclosed techniques. Specifically, instances of a replication processor (e.g., replication processor $110_1$, . . . , replication processor $110_N$) that each comprise a capacity analyzer (e.g., capacity analyzer $312_1$, . . . , capacity analyzer $312_N$) and a message generator (e.g., message generator $314_1$, . . . , message generator $314_N$) are implemented at respective nodes in cluster 350. The capacity analyzers at each node monitor and store (e.g., in capacity data $204_1$, . . . , capacity data $204_N$) the replication capacity of the node. In most cases, the capacity analyzers monitor the network resource capacity to issue replication messages.

For example, a capacity analyzer might track the count of the outstanding bytes of a particular NIC as an indicator of replication capacity. An observation window of, for instance, one second might be implemented to facilitate a comparison of the then-current quantity of outstanding bytes (e.g., payload bytes) to the maximum data rate of the NIC, which is specified as "per-second" quantity (e.g., 40 Gbps for a 40 GbE NIC). Such a comparison leads to a quantified indication of replication capacity of that NIC of that node. Of course, one node may have multiple NICs, in which case the capacity analyzer can perform tracking over all available NICs.

As a specific example of quantifying replication capacity involving remote procedure calls, a capacity analyzer might track the amount of outstanding I/O of corresponding remote procedure calls (RPCs) of a particular NIC as an indicator of replication capacity. Other windowing techniques and other replication capacity metrics and/or measurement techniques (e.g., moving average, exponentially-decaying moving average, etc.) are possible.

In certain embodiments, a capacity analyzer at a node might also monitor the CPU resource capacity as an indicator of replication capacity. For example, the CPU consumption by the controller of the node might indicate a capacity for generating and issuing replication messages. The message generators at each node access the then-current replication capacity of the node (e.g., as determined by the capacity analyzers) to generate replication messages (e.g., replication messages $342_1$) and/or downstream replication messages (e.g., downstream replication messages $344_1$) to issue over network 360 to receiving nodes and/or downstream nodes, respectively.

Further details of the data structures associated with the foregoing storage facilities and/or other data objects accessed by the herein disclosed techniques are disclosed as follows.

Figure 3B:
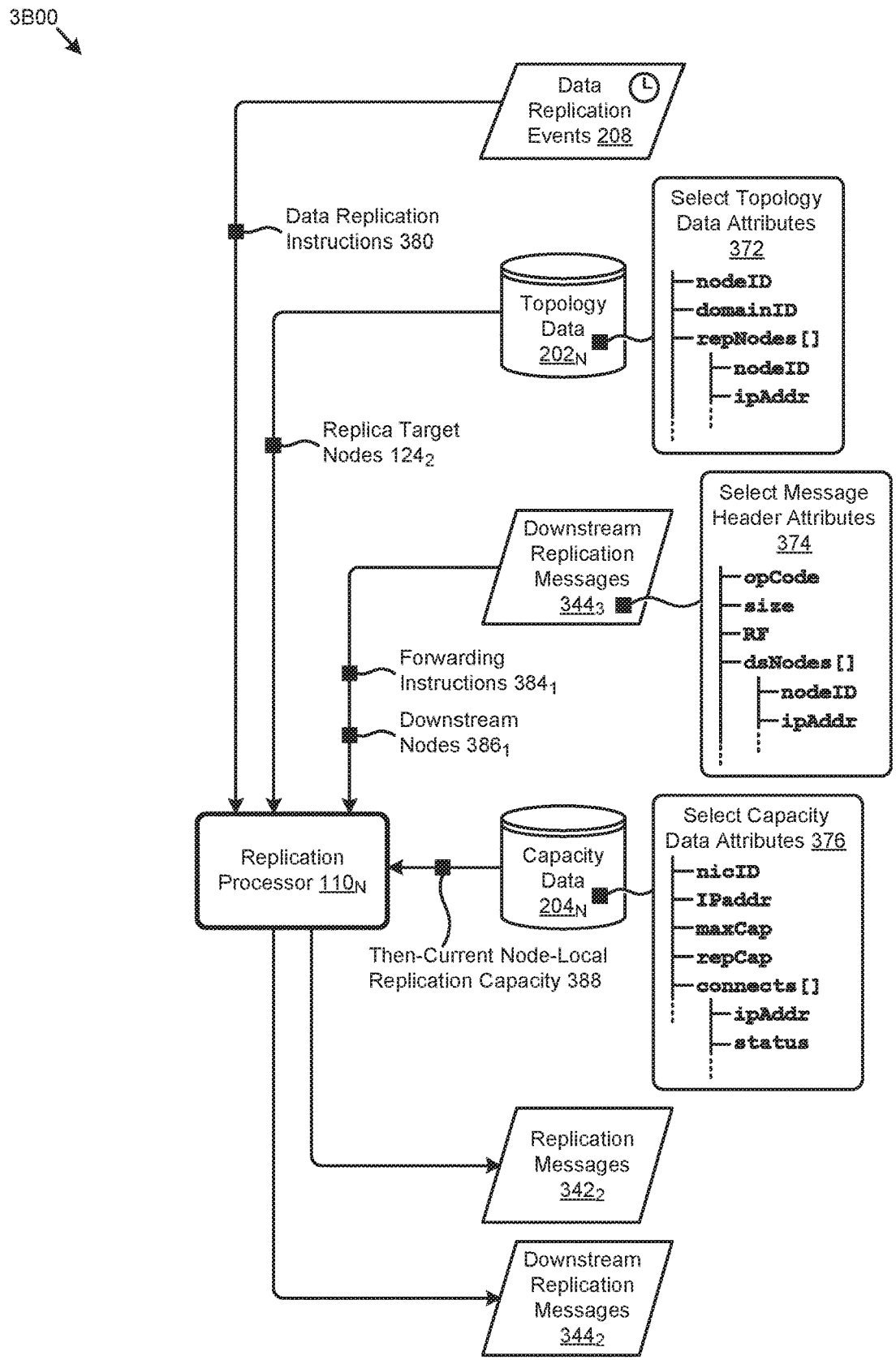
FIG. 3B presents a selected set of specialized data structures that improve the way a computer stores and retrieves data in systems that perform iterative execution of data replication operations under conditions of dynamically-changing resource availabilities.

FIG. 3B presents a selected set of specialized data structures 3B00 that improve the way a computer stores and retrieves data in systems that perform iterative execution of data replication operations under conditions of dynamically-changing resource availabilities. As an option, one or more variations of specialized data structures 3B00 or any aspect thereof may be implemented in the context of the architecture and functionality of the embodiments described herein. The specialized data structures 3B00 or any aspect thereof may be implemented in any environment.

FIG. 3B illustrates one aspect pertaining to performing node-by-node analysis to adjust replication operations based at least in part on the then-current resource conditions as observed at each node. Specifically, the figure is being presented to illustrate one embodiment of data structures that can be implemented to organize certain data used when implementing the herein disclosed techniques. The figure furthers illustrates a logical depiction of data flows of such data in an example scenario as performed in accordance with the herein disclosed techniques.

As shown in FIG. 3B, a replication processor $110_N$ implemented in a particular subject node receives and/or accesses various data to generate one or more instances of replication messages $342_2$ and/or one or more instances of downstream replication messages $344_2$ in accordance with the herein disclosed techniques. In certain cases, such as when replication processor $110_N$ is implemented in a source node associated with a set of working data to be replicated, a set of data replication instructions 380 might be received in response to one or more data replication events 208. For example, the data replication instructions 380 might result from adherence to a policy. The occurrence of data replication events 208 and corresponding data replication instructions can be based at least in part on a time interval and/or on certain changes to the working data. For example, a replication policy that indicates "Perform RF=3 replication as frequently as needed to achieve a recovery point objective of 20 minutes" might be codified in data replication events and corresponding data replication instructions that are raised at least every 20 minutes. The replication processor $110_N$ might access the topology data $202_N$ to identify a set of replica target nodes $124_2$ that correspond to the data replication instructions 380.

The data comprising topology data $202_N$ and/or any other data described herein can be organized and/or stored using various techniques. For example, the topology data $202_N$ might be organized and/or stored in a tabular structure (e.g., relational database table) that has rows that relate various node attributes with a particular node in a cluster of nodes. As another example, the information might be organized and/or stored in a programming code object that has instances corresponding to a particular node and properties corresponding to the various attributes associated with the node. As depicted in a set of select topology data attributes 372, a data record (e.g., table row or object instance) for a particular node might describe a node identifier (e.g., stored in a "nodeID" field), a failure domain identifier (e.g., stored in a "domainID" field), a list of replica target nodes assigned to the node (e.g., stored in a "repNodes[ ]" object), and/or other node attributes. As shown, the "repNodes[ ]" can comprise a node identifier (e.g., stored in a "nodeID" field), an IP address (e.g., stored in an "ipAddr" field), and/or other attributes associated with each of the replica target nodes.

In other cases, such as when replication processor $110_N$ is implemented in a receiving node in non-originating iterations of a particular replication procedure, a set of forwarding instructions $384_1$ and a list of downstream nodes $386_1$ might be received by replication processor $110_N$ from one or more downstream replication messages $344_3$. As indicated in a set of select message header attributes 374, at least a portion of the forwarding instructions $384_1$ might be codified in the header of a download replication message as an opcode (e.g., stored in an "opCode" field). Furthermore, the downstream nodes $386_1$ might be codified in a list of downstream nodes (e.g., stored in a "dsNodes[ ]" object), which describes a node identifier (e.g., stored in a "nodeID" field), an IP address (e.g., stored in an "ipAddr" field), and/or other attributes associated with each of the downstream nodes. The downstream replication message header might also specify a payload size (e.g., stored in a "size" field), a replication factor (e.g., stored in an "RF" field), and/or other attributes pertaining to the downstream replication message.

To determine the composition of replication messages $342_2$ and/or downstream replication messages $344_2$ to generate according to the herein disclosed techniques, the replication processor $110_N$ accesses instances of the then-current node-local replication capacity 388 derived from capacity data $204_N$. In certain embodiments, the replication processor $110_N$ might also be responsible for populating the replication capacity information in capacity data $204_N$. As indicated by a set of select capacity data attributes 376, replication capacity information might be stored and/or organized in capacity data $204_N$ for each NIC implemented at a particular node.

More specifically, a data record (e.g., table row or object instance) in capacity data $204_N$ might describe a NIC identifier (e.g., stored in a "nicID" field), an IP address of the NIC (e.g., stored in an "ipAddr" field), a maximum capacity of the NIC (e.g., stored in a "maxCap" field), a then-current replication capacity of the NIC (e.g., stored in a "repCap" field), and/or other attributes associated with the NIC. As further shown in select capacity data attributes 376, the capacity data $204_N$ might also list the connections associated with a NIC (e.g., stored in a "connects[ ]" object), which describes an IP address (e.g., stored in an "ipAddr" field), a connection status (e.g., stored in a "status" field), and/or other attributes associated with each of the NIC connections.

Various discussions herein include techniques that access one or more of the foregoing data sets and/or data structures to perform node-by-node analyses that adjust replication operations based at least in part on the then-current replication capacity as observed at each node (e.g., ongoing operations 240 of FIG. 2), which techniques are disclosed in further detail as follows.

Figure 4A:
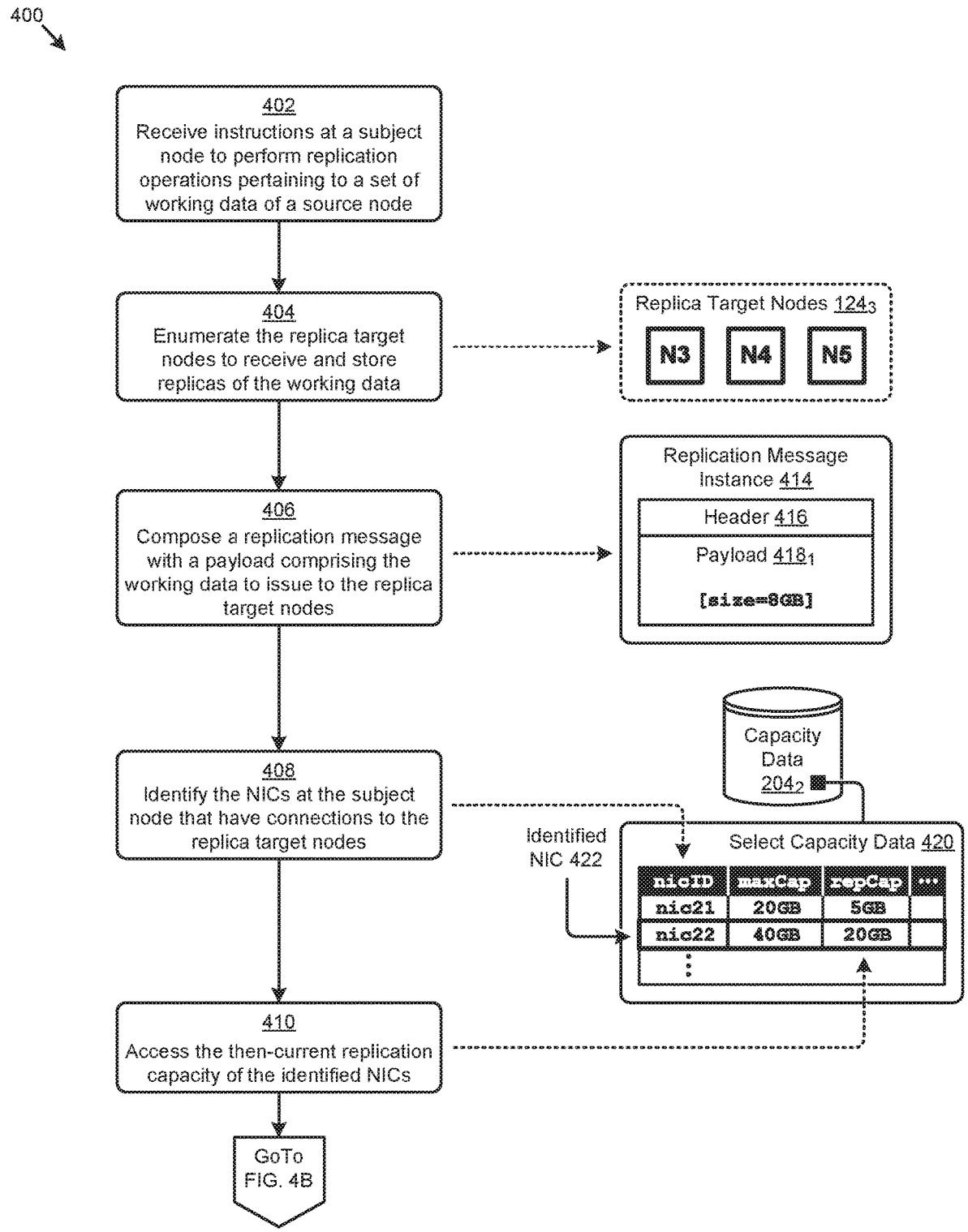
FIG. 4A, FIG. 4B, and FIG. 4C present a node-specific replication operation management technique as used in systems that perform iterative execution of data replication operations under conditions of dynamically-changing resource availabilities.
Figure 4B:
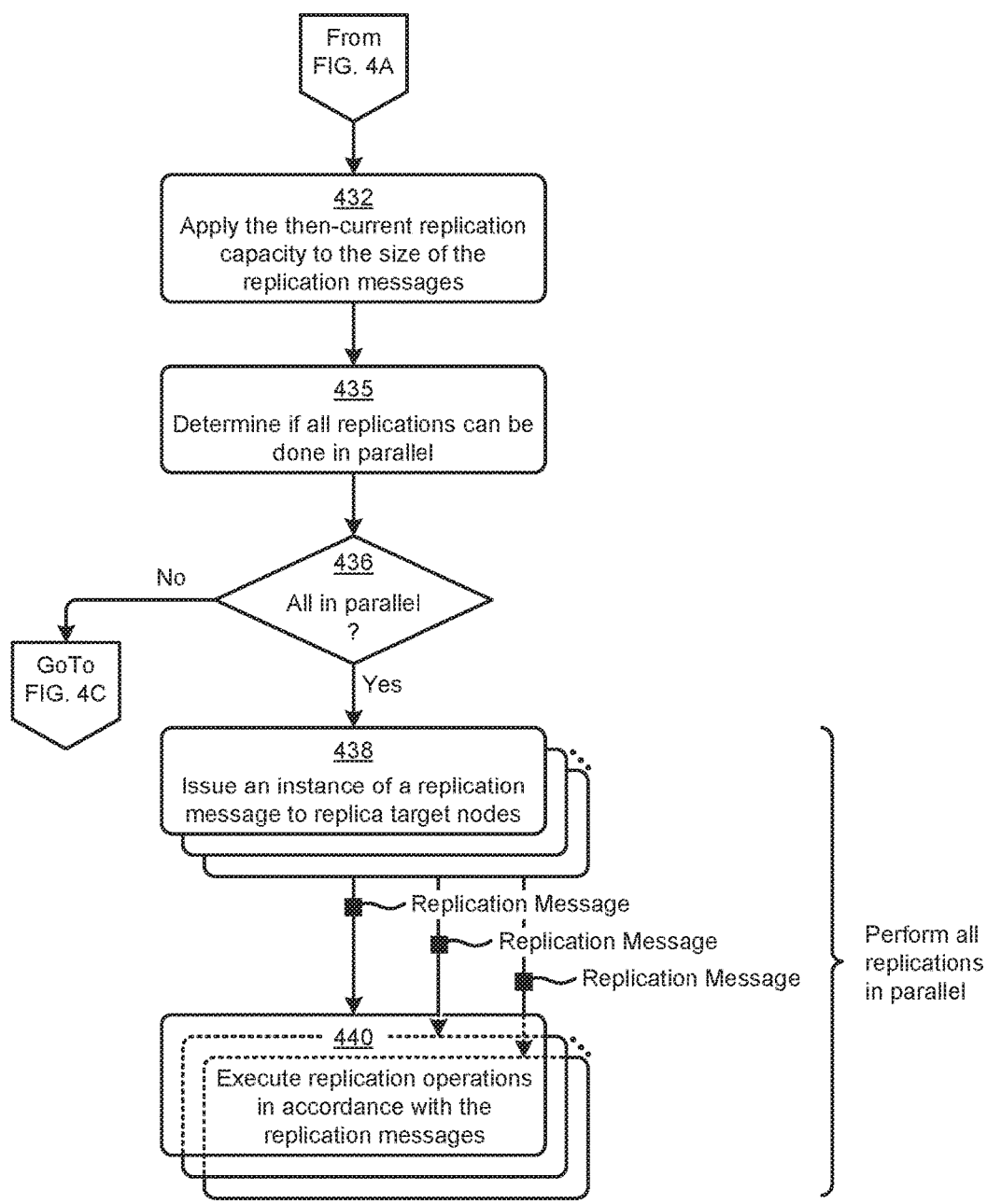
Figure 4C:
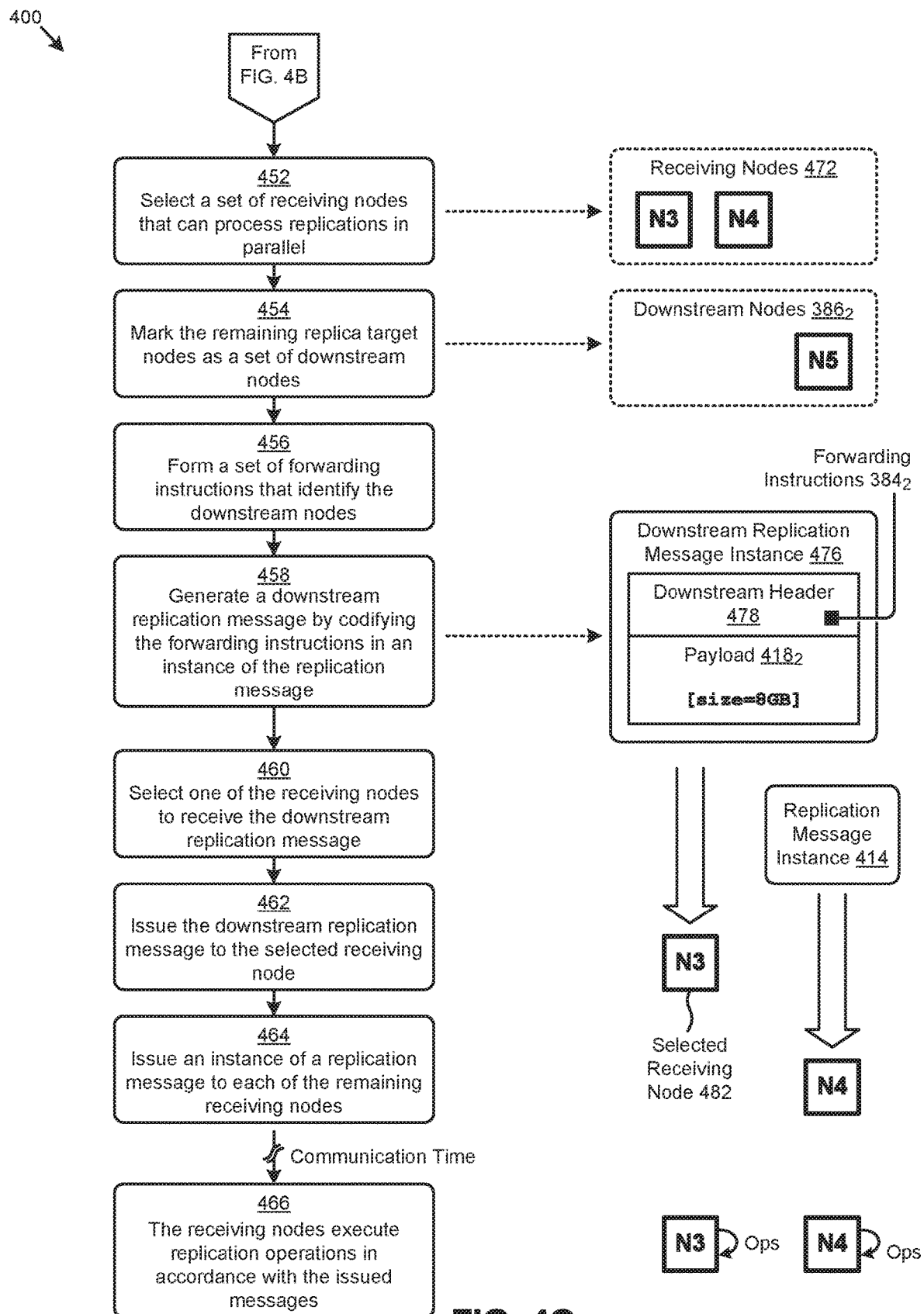

FIG. 4A, FIG. 4B, and FIG. 4C present a node-specific replication operation management technique 400 as used in systems that perform iterative execution of data replication operations under conditions of dynamically-changing resource availabilities. As an option, one or more variations of node-specific replication operation management technique 400 or any aspect thereof may be implemented in the context of the architecture and functionality of the embodiments described herein. The node-specific replication operation management technique 400 or any aspect thereof may be implemented in any environment.

FIG. 4A, FIG. 4B, and FIG. 4C illustrate one aspect pertaining to performing node-by-node analysis to adjust replication operations based at least in part on the then-current resource conditions as observed at each node. Specifically, the figures are presented to illustrate one embodiment of certain steps and/or operations that might be performed at a particular subject node from the nodes participating in a data replication procedure. Iterations of the steps and/or operations comprising node-specific replication operation management technique 400 might be performed at various instances of the subject node to carry out the data replication procedure. A representative scenario is also shown in the figures to illustrate an example application of the node-specific replication operation management technique 400.

The node-specific replication operation management technique 400 can commence as shown in FIG. 4A by receiving instructions at a subject node to perform replication operations pertaining to a data replication procedure to replicate a set of working data of a source node (step 402). In a first case, the subject node might be the source node that receives data replication instructions in response to some data replication event. In a second case, the subject node might a receiving node from the replica target nodes that receive forwarding instructions in the second or Nth iteration of the steps and/or operations of node-specific replication operation management technique 400. The replica target nodes to receive and store replicas of the working data are enumerated (step 404). As an example, a set of replica target nodes $124_3$ might comprise a node N3, a node N4, and a node N5. In the foregoing cases, the replica target nodes $124_3$ might comprise the entire set of nodes assigned to accept replicas of the working data, or the set of downstream nodes specified in the forwarding instructions.

A replication message with a payload that comprises the working data is composed to issue to the replica target nodes (step 406). As shown, a representative replication message instance 414 might comprise a header 416 and a payload $418_1$ having a size of "8 GB". The NICs at the subject node that have connections to the replica target nodes are identified (step 408). As shown in a set of select capacity data 420 from capacity data $204_2$, a NIC "nic22" might be the identified NIC (e.g., identified NIC 422) with connections to the replica target nodes. The replication capacity of each of the identified NICs are accessed (step 410). The select capacity data 420 indicates that the replication capacity of NIC "nic22" is "20 GB".

Referring to FIG. 4B, at step 432, the then-current replication capacity (e.g., as determined in step 410 of FIG. 4A) is compared to the total size of the replication messages. Step 435 serves to determine if all replications can be done in parallel. If so, the "Yes" branch of decision 436 is taken. At step 438, an instance of the replication message is issued to each of the replica target nodes, and replication operations are executed at the replica target nodes in accordance with their respective received replication messages (step 440). The replication messages provided might each have an opcode in header 416 that instructs the respective receiving nodes to merely store the payload (e.g., the working data) of the message as replication data in local storage—without performing any further forwarding operations.

In some embodiments, an aggregate payload can be calculated by considering all outstanding network workloads pending at one or more NICs. For example, I/Os to a particular NIC might be delivered to the NIC via I/O commands or remote procedure calls. Any number of such outstanding I/O commands and/or outstanding remote procedure calls can be scanned so as to determine the aggregate payload to be sent out through the network interfaces of that node. Such a technique can be used to compute available replication capacity for any number or configuration of network workloads arising from any number of pending I/O commands and/or any number or configuration of network workloads arising from remote procedure calls of any combination of sizes.

In some specific environments, the payload (e.g., a block or extent of working data) to be replicated is a constant size (e.g., 512 bytes, 1024 bytes, 2048 bytes, 4 MB, 8 GB, etc.). In such an environment decision 436 can be based a determined maximum message count (e.g., the number of constant-sized messages that can be sent given a then-current available NIC capacity) as compared to the number of downstream nodes. As an example, a maximum message count can be determined by performing an integer divide of a then-current available replication capacity (e.g., "20 GB") by a constant-sized replication message payload size (e.g., "8 GB"). In this case, the result is a maximum message count equal to 2. The determined maximum message count is then compared to a replica target node count, which is equal to 3. If the maximum message count is greater than or equal to the replica target node count, then the "Yes" path of decision 436 is taken since all replicas can be performed in parallel. However, if the maximum message count is less than the replica target node count then the "No" path of decision 436 is taken and the following steps and/or operations are performed.

Referring to FIG. 4C, step 452 serves to determine a set of receiving nodes that can process replications in parallel, given the then-current replication capacity of the sending node. The remaining replica target nodes are assigned to a set of downstream nodes (step 454). The foregoing steps constitute partitioning the full set of replica target nodes into a set of receiving nodes 472 (e.g., node N3 and node N4) and a set of downstream nodes $386_2$ (e.g., node N5) where the partitioning is based at least in part on the replication capacity (e.g., as determined in step 410 of FIG. 4A). In some cases, the set of downstream nodes might be an empty set.

A set of forwarding instructions that identify the downstream nodes are formed (step 456). The forwarding instructions are codified in an instance of the replication message to generate a downstream replication message (step 458). As illustrated, a downstream replication message instance 476 comprises a downstream header 478 with forwarding instructions $384_2$ and an instance of a payload $418_2$ from replication message instance 414.

One of the receiving nodes is selected to receive the downstream replication message (step 460). The selected receiving node might be selected based at least in part on a rank order of the replica target nodes (e.g., the highest ranked node is selected). In some cases, the rank order might be arbitrarily determined. In other cases, the subject node or another agent might determine the rank order based at least in part on, for example, the then-current replication capability at the receiving nodes. The current replication capability at each of the receiving nodes can be monitored on an ongoing basis and made accessible to nodes of the cluster such that at any moment in time, any node in a replication group can retrieve the rank order of the replica target nodes. The monitoring might include monitoring of workloads, which in turn might monitor CPU utilization, I/O capacity, etc. In some cases, the monitoring includes interaction with one or more predictors such that in addition to considering the then-current conditions, predicted conditions can be considered as well. Strictly as one example, a particular node might exhibit low then-current CPU utilization, however upon consulting a predictor, it might be determined that that node is soon to be the target node of a migration. Such predictions can be used to avoid overloading a receiving node and/or such predictions can be used to break a tie.

Once selected, the selected receiving node is issued the downstream replication message (step 462). Instances of the replication message are issued to the remaining receiving nodes (step 464). For example, node N3 might be the selected receiving node 482 that receives the downstream replication message instance 476 and node N4 is the remaining receiving node that receives the replication message instance 414. Replication operations are executed in accordance with respective issued messages at the receiving nodes (step 466). For example, the shown downstream replication message instance 476 might have an opcode in downstream header 478 that instructs the selected receiving node 482 to store the payload $418_2$ (e.g., the working data) of the message and to determine replication operations to perform at the downstream nodes identified in the forwarding instructions $384_2$.

ADDITIONAL EMBODIMENTS OF THE DISCLOSURE

Additional Practical Application Examples

Figure 5:
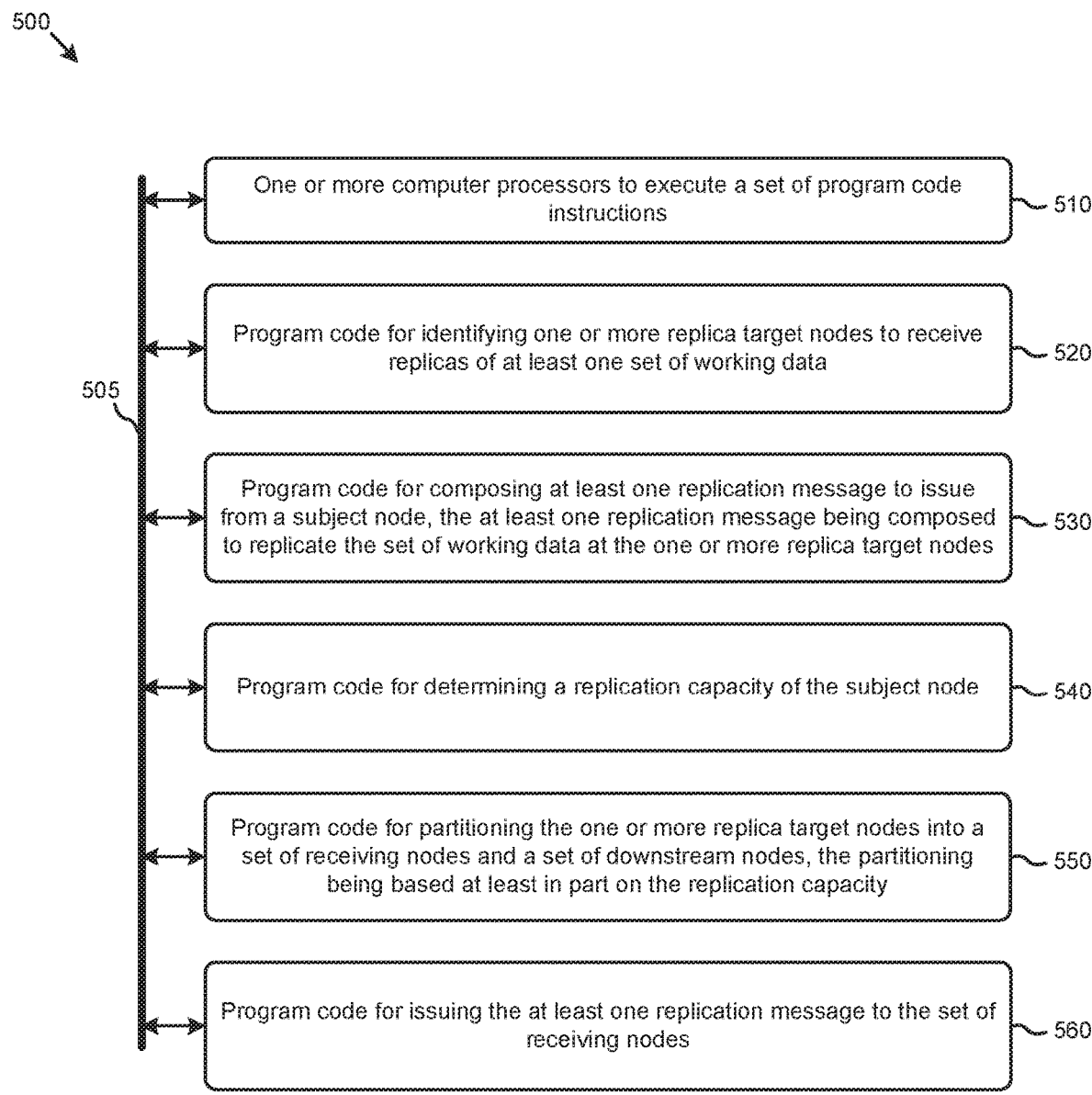
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually and/or as combined, serve to form improved technological processes that address suboptimal data replication procedures. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising one or more computer processors to execute a set of program code instructions (module 510) and modules for accessing memory to hold program code instructions to perform: identifying one or more replica target nodes to receive replicas of at least one set of working data (module 520); composing at least one replication message to issue from a subject node, the at least one replication message being composed to replicate the set of working data at the one or more replica target nodes (module 530); determining a replication capacity of the subject node (module 540); partitioning the one or more replica target nodes into a set of receiving nodes and a set of downstream nodes, the partitioning being based at least in part on the replication capacity (module 550); and issuing the at least one replication message to the set of receiving nodes (module 560).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

SYSTEM ARCHITECTURE OVERVIEW

Additional System Architecture Examples

Figure 6A:
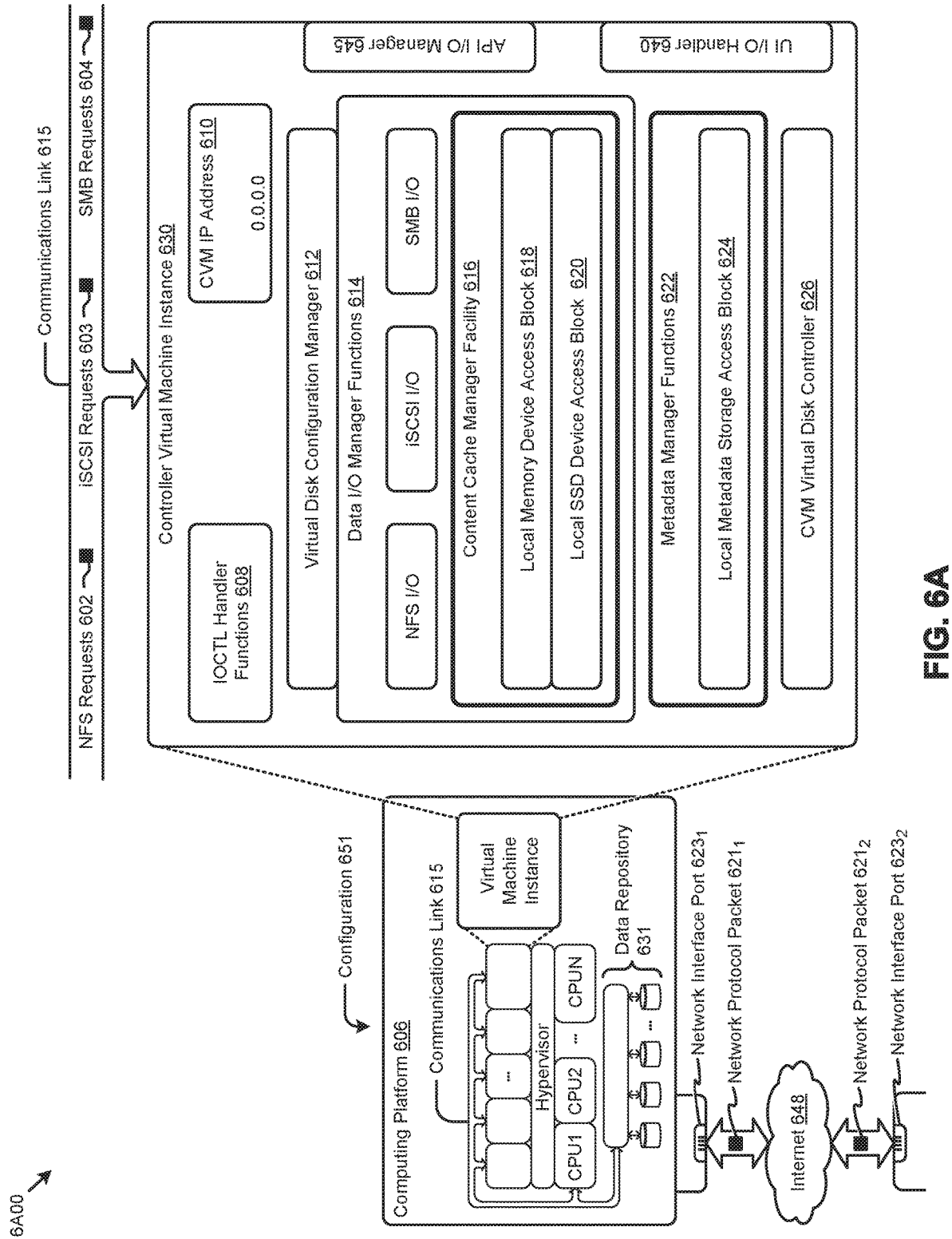
FIG. 6A, FIG. 6B, and FIG. 6C depict virtualized controller architectures comprising collections of interconnected components suitable for implementing embodiments of the present disclosure and/or for use in the herein-described environments.

FIG. 6A depicts a virtualized controller as implemented by the shown virtual machine architecture 6A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 6A00 comprises a collection of interconnected components suitable for implementing embodiments of the present disclosure and/or for use in the herein-described environments. Moreover, virtual machine architecture 6A00 includes a virtual machine instance in configuration 651 that is further described as pertaining to controller virtual machine instance 630. Configuration 651 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 630.

In this and other configurations, a controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output (I/O or IO) can be handled by one or more IO control handler functions (e.g., IOCTL handler functions 608) that interface to other functions such as data IO manager functions 614 and/or metadata manager functions 622. As shown, the data IO manager functions can include communication with virtual disk configuration manager 612 and/or can include direct or indirect communication with any of various block IO functions (e.g., NFS IO, iSCSI IO, SMB IO, etc.).

In addition to block IO functions, configuration 651 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through API IO manager 645.

Communications link 615 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 630 includes content cache manager facility 616 that accesses storage locations, possibly including local dynamic random access memory (DRAM) (e.g., through local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 631, which in turn can be formatted into any one or more storage areas, and which can comprise parameterized storage accessible by a key (e.g., a filename, a table name, a block address, an offset address, etc.). Data repository 631 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 624. The data repository 631 can be configured using CVM virtual disk controller 626, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 651 can be coupled by communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). Configuration 651 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

Computing platform 606 may transmit and receive messages that can be composed of configuration data and/or any other forms of data and/or instructions organized into a data structure (e.g., communications packets). In some cases, the data structure includes program code instructions (e.g., application code) communicated through the Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or the results of executing program code can be delivered to a particular user via a download (e.g., a download from computing platform 606 over the Internet 648 to an access device).

Configuration 651 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to iterative execution of data replication operations under conditions of dynamically-changing resource availabilities. In some embodiments, a module may include one or more state machines and/or combinational logic used to implement or facilitate the operational and/or performance characteristics pertaining to iterative execution of data replication operations under conditions of dynamically-changing resource availabilities.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of iterative execution of data replication operations under conditions of dynamically-changing resource availabilities). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to iterative execution of data replication operations under conditions of dynamically-changing resource availabilities, and/or for improving the way data is manipulated when performing computerized operations pertaining to performing node-by-node analysis to adjust replication operations based at least in part on the then-current resource conditions as observed at each node.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 6B:
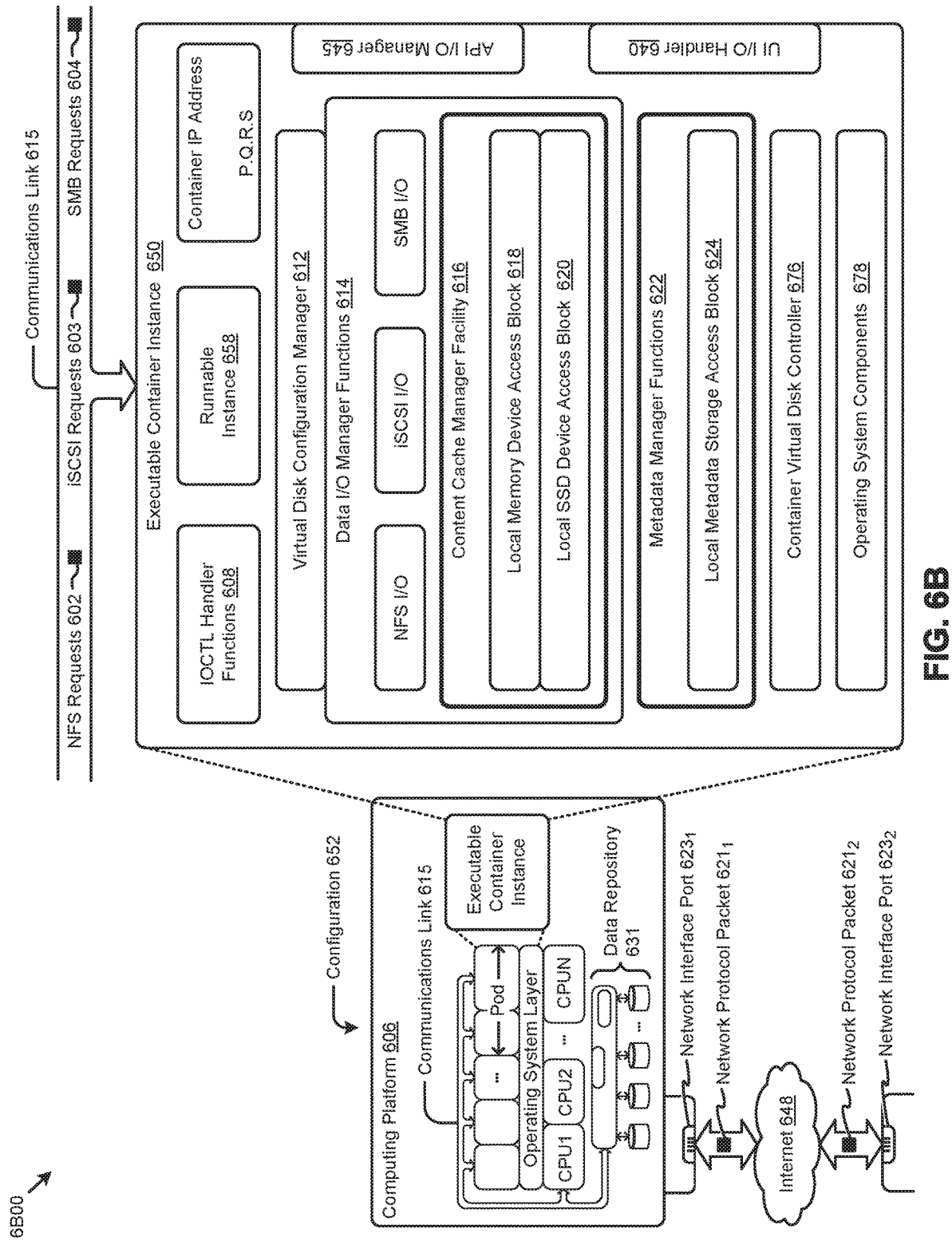

FIG. 6B depicts a virtualized controller implemented by containerized architecture 6B00. The containerized architecture comprises a collection of interconnected components suitable for implementing embodiments of the present disclosure and/or for use in the herein-described environments. Moreover, the shown containerized architecture 6B00 includes an executable container instance in configuration 652 that is further described as pertaining to executable container instance 650. Configuration 652 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 650). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 678, however such a separate set of operating system components need not be provided. As an alternative, an executable container can include runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
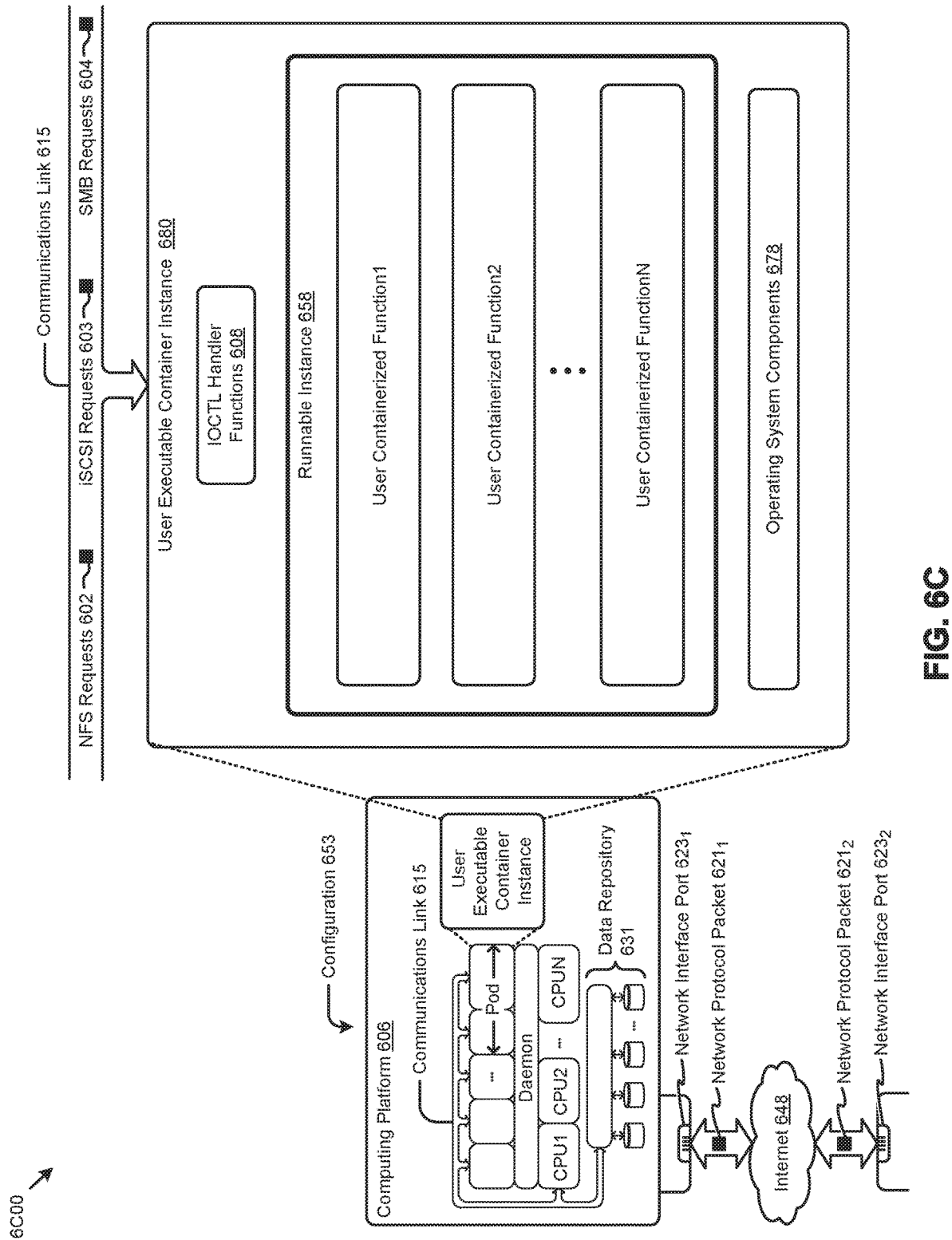

FIG. 6C depicts a virtualized controller implemented by a daemon-assisted containerized architecture 6C00. The containerized architecture comprises a collection of interconnected components suitable for implementing embodiments of the present disclosure and/or for use in the herein-described environments. Moreover, the shown daemon-assisted containerized architecture includes a user executable container instance in configuration 653 that is further described as pertaining to user executable container instance 680. Configuration 653 includes a daemon layer (as shown) that performs certain functions of an operating system.

User executable container instance 680 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 658). In some cases, the shown operating system components 678 comprise portions of an operating system, which portions are interfaced with or included in the runnable instance and/or any user containerized functions. In this embodiment of a daemon-assisted containerized architecture, the computing platform 606 might or might not host operating system components other than operating system components 678. More specifically, the shown daemon might or might not host operating system components other than operating system components 678 of user executable container instance 680.

The virtual machine architecture 6A00 of FIG. 6A and/or the containerized architecture 6B00 of FIG. 6B and/or the daemon-assisted containerized architecture 6C00 of FIG. 6C can be used in any combination to implement a distributed platform that contains multiple servers and/or nodes that manage multiple tiers of storage where the tiers of storage might be formed using the shown data repository 631 and/or any forms of network accessible storage. As such, the multiple tiers of storage may include storage that is accessible over communications link 615. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 651 of FIG. 6A) to manage the interactions between the underlying hardware and user virtual machines or containers that run client software.

Distinct from user virtual machines or user executable containers, a special controller virtual machine (e.g., as depicted by controller virtual machine instance 630) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    storing a particular data item at a first replication location comprising a storage device of a first computing node of a plurality of computing nodes that comprise a computing cluster, wherein a replication policy is applicable for replication of data items in the computing cluster, each computer node of the plurality of computing nodes having a processor and a storage device, and at least one data item to be replicated at three or more replication locations in the computing cluster according to the replication policy;
    dynamically identifying, by the first computing node, a second computing node of the plurality of computing nodes different from the first computing node, wherein the second computing node is dynamically identified in response to receiving or storing the particular data item at the first computing node, the second computing node being identified based on at least analysis by the first computing node of a capacity of one or more computing nodes of the plurality of computing nodes; and
    transmitting the same particular data item and a forwarding instruction to the second computing node, wherein the forwarding instruction is transmitted in response to a determination that a replication factor is at least three, the second computing node dynamically identifies a third computing node of the plurality of computing nodes different from the first and second computing nodes based on at least dynamic analysis by the second computing node of a capacity of at least one computing node of the plurality of computing nodes, the at least one computing node being different from the first and second computing nodes.

2. The method of claim 1, wherein the same particular data item and the forwarding instruction are contained in a replication message.

3. The method of claim 2, wherein the forwarding instruction is in a header of the replication message.

4. The method of claim 2, wherein the replication message includes a replication factor.

5. The method of claim 1, wherein first computing node, the second computing node, and the at least one computing node are in different failure domains.

6. The method of claim 1, wherein the second computing node is selected based at least in part on a rank order and the capacity of one or more computing nodes.

7. The method of claim 1, wherein the capacity of one or more computing nodes is derived from at least a central processing unit (CPU) resource capacity.

8. The method of claim 1, wherein the capacity of one or more computing nodes is derived from at least a network resource capacity, the network resource capacity is associated with a network interface card of the first computing node, and the network interface card has a connection with the first computing node.

9. A non-transitory computer readable medium having stored thereon a set of instructions which, when stored in memory and executed by a processor causes a set of acts comprising:
    storing a particular data item at a first replication location comprising a storage device of a first computing node of a plurality of computing nodes that comprise a computing cluster, wherein a replication policy is applicable for replication of data items in the computing cluster, each computing node of the plurality of computing nodes having a processor and a storage device, and at least one data item to be replicated at three or more replication locations in the computing cluster according to the replication policy;
    dynamically identifying, by the first computing node, a second computing node of the plurality of computing nodes different from the first computing node, wherein the second computing node is dynamically identified in response to receiving or storing the particular data item at the first computing node, the second computing node being identified based on at least analysis by the first computing node of a capacity of one or more computing nodes of the plurality of computing nodes; and
    transmitting the same particular data item and a forwarding instruction to the second computing node, wherein the forwarding instruction is transmitted in response to a determination that a replication factor is at least three, the second computing node dynamically identifies a third computing node of the plurality of computing nodes different from the first and second computing nodes based on at least dynamic analysis by the second computing node of a capacity of at least one computing node of the plurality of computing nodes, the at least one computing node being different from the first and second computing nodes.

10. The computer readable medium of claim 9, wherein the data item and the forwarding instruction are contained in a replication message.

11. The computer readable medium of claim 10, wherein the forwarding instruction is in a header of the replication message.

12. The computer readable medium of claim 11, wherein the second computing node is selected based at least in part on a rank order and the capacity of one or more computing nodes.

13. The computer readable medium of claim 10, wherein the replication message includes a replication factor.

14. The computer readable medium of claim 10, wherein the capacity of the one or more computing nodes is derived from at least a central processing unit (CPU) resource capacity.

15. The computer readable medium of claim 9, wherein first computing node, the second computing node, and the at least one computing node are in different failure domains.

16. The computer readable medium of claim 10, wherein the capacity of one or more computing nodes is derived from at least a network resource capacity, the network resource capacity is associated with a network interface card of the first computing node, and the network interface card has a connection with the first computing node.

17. A system comprising:
a storage medium having stored thereon a set of instructions; and
a processor that executes the set of instructions to cause a set of acts comprising,
storing a particular data item at a first replication location comprising a storage device of a first computing node of a plurality of computing nodes that comprise a computing cluster, wherein a replication policy is applicable for replication of data items in the computing cluster, each computing node of the plurality of computing nodes having a processor and a storage device, and at least one data item to be replicated at three or more replication locations in the computing cluster according to the replication policy;
dynamically identifying, by the first computing node, a second computing node of the plurality of computing nodes different from the first computing node, wherein the second computing node is dynamically identified in response to receiving or storing the particular data item at the first computing node, the second computing node being identified based on at least analysis by the first computing node of a capacity of one or more computing nodes of the plurality of computing nodes; and
transmitting the same particular data item and a forwarding instruction to the second computing node, wherein the forwarding instruction is transmitted in response to a determination that a replication factor is at least three, the second computing node dynamically identifies a third computing node of the plurality of computing nodes different from the first and second computing nodes based on at least dynamic analysis by the second computing node of a capacity of at least one computing node of the plurality of computing nodes, the at least one computing node being different from the first and second computing nodes.

18. The system of claim 17, wherein the data item and the forwarding instruction are contained in a replication message.

19. The system of claim 18, wherein the forwarding instruction is in a header of the replication message.

20. The system of claim 18, wherein the replication message includes a replication factor.

21. The system of claim 17, wherein first computing node, the second computing node, and the at least one computing node are in different failure domains.

22. The system of claim 17, wherein the second computing node is selected based at least in part on a rank order and the capacity of one or more computing nodes.

23. The system of claim 17, wherein the capacity of the one or more computing nodes is derived from at least a central processing unit (CPU) resource capacity.

24. The system of claim 17, wherein the capacity of the one or more computing nodes is derived from at least a network resource capacity, the network resource capacity is associated with a network interface card of the first computing node, and the network interface card has a connection with the first computing node.

* * * * *